(12) United States Patent
Wåhlander et al.

(10) Patent No.: US 6,256,667 B1
(45) Date of Patent: Jul. 3, 2001

(54) INTELLIGENT MESSAGING

(75) Inventors: Christer Wåhlander, Ekerö ; Anders Skog, Järfälla; Mikael Nilsson, Malmö, all of (SE)

(73) Assignee: Viewlocity AB, Solna (SE)

( * ) Notice: Subject to any disclaimer, the term of this patent is extended or adjusted under 35 U.S.C. 154(b) by 0 days.

(21) Appl. No.: 08/940,024

(22) Filed: Sep. 29, 1997

(51) Int. Cl.[7] .............................. G06F 15/16; G06F 15/17
(52) U.S. Cl. ......................... 709/218; 709/230; 709/224
(58) Field of Search ................................... 709/230, 224, 709/218; 705/40, 28

(56) References Cited

U.S. PATENT DOCUMENTS

| 5,202,977 | 4/1993 | Pasetes, Jr. et al. . | |
|---|---|---|---|
| 5,390,247 | 2/1995 | Fischer . | |
| 5,410,675 | 4/1995 | Shreve et al. . | |
| 5,557,780 | 9/1996 | Edwards et al. . | |
| 5,649,117 | * 7/1997 | Landry | 705/40 |
| 5,758,126 | * 5/1998 | Daniels et al. | 709/218 |
| 5,893,076 | * 4/1999 | Hafner et al. | 705/28 |
| 5,920,847 | * 7/1999 | Kolling et al. | 705/40 |
| 5,964,839 | * 10/1999 | Johnson et al. | 709/224 |

FOREIGN PATENT DOCUMENTS

| 2271002 | 9/1992 | (DE) . |
|---|---|---|
| WO 97/35268 | 9/1997 | (WO) . |

OTHER PUBLICATIONS

Victor Werner, "Frontec Introduces Latest Messaging Technology for Electronic Commerce: Intelligent Messaging and a New Internet Product", Business Wire, Feb. 4, 1997.*

AT&T EDI: An Architecture for Integrated Electronic Messaging, *AT&T Technology*, vol. 5, No. 1, pp. 40–44, J.A. Bednar, Jr. (1990).

Security in Value Added Networks—Security Requirements for EDI, *Computer Standards & Interfaces*, vol. 12, No. 1, pp. 23–33, Borka Jerman–Blazic (1991).

X.500 Directory Services Support for Electronic Data Interchange (EDI), *Computer Networks and ISDN Systems*, vol. 27, pp. 691–701, Donal O'Mahony et al. (1995).

* cited by examiner

*Primary Examiner*—Mark H. Rinehart
*Assistant Examiner*—Ivan C. Pierce, III
(74) *Attorney, Agent, or Firm*—Burns, Doane, Swecker & Mathis, L.L.P.

(57) ABSTRACT

The present invention refers to systems and methods for electronic data interchange messaging, i.e. for the interchange of electronic messages comprising and transferring data provided in a predefined, preferably standardized structure or form in such a way that said data may be identified and used as data element values or strings in further processing functions by the receiving system or application. According to the invention, a process to be executed in a computer system and comprising electronic data interchange is defined in relation to a corresponding data defining, comprising a set of data elements for electronic data to be successively interchanged or processed in each execution of said process, wherein said process is arranged to automatically write data included in a received electronic data interchange message into, and read data for electronic data interchange message sending from, predefined data elements of a data instance of the data definition during the execution of said process.

28 Claims, 21 Drawing Sheets

INTELLIGENT MESSAGING

FIELD OF INVENTION

The present invention refers to systems and methods for electronic data interchange messaging, i.e. for the interchange of electronic messages comprising and transferring data provided in a predefined, preferably standardized structure or form in such a way that said data may be identified and used as data element values or strings in further processing functions by the receiving system or application.

TECHNICAL BACKGROUND AND PRIOR ART

In spite of the long driven computerization, still a large amount of the transfer of information between companies is today being done by use of paper documents. Essentially all information initially resides in a computer system, but when it is to be transferred to a business partner or the like, it is written out on paper, sent by facsimile, letter of delivery service to the receiver. The latter inputs the received information into his computer system manually. This procedure is repeated throughout a number of links in a distribution chain, and basically the same information is inputted manually in each step.

By the use of Electronic Data Interchange, the flow of information between different companies is automated. The companies' computer system or applications for ordering, storing, invoice handling, production, transportation and other functions may then automatically exchange information. This requires standardized or structured electronic messages sent via communication networks to the counterpart, which then automatically may process the information further in his internal computer system.

There data not exist any exact definition of electronic data interchange (EDI). However, it may be said that the following should be satisfied for electronic data interchange communication:

a) The communication between computer system shall be direct, internal or external, via communication networks, i.e. not via written papers, diskettes or magnetic tapes.
b) The information shall be structured;
c) The communication shall preferably make use of a communication standard, such as EDIFACT or X.12 or a similar defined structure agreed upon by the communicating parties; and
d) The information shall be directly computer processable at the receiver, being it a computer or an application, i.e. essentially without the need of manual operations to input the information at the receiver.

Two examples of such electronic data interchange standards is X.12 and EDIFACT (the Electronic Data Interchange For Administration, Commerce and Transport). EDIFACT is well established in Europe, and electronic data interchange system, EDIFACT provides a set of rules for, for example, the syntax and message meaning/sentence to be used within the EDIFACT system. X.12 is a similar standardized system used in the USA.

However, even though the use of EDI constitutes a essential leap forward in the automation of processes involving messaging, there is still a need for new techniques relating to how the system and/or system process shall be designed and implemented in order to provide a faster and simpler management the EDI messaging.

SUMMARY OF THE INVENTION

An object of the invention is to increase the speed and simplicity of the design, construction, implementation, management, maintenance and use of electronic data interchange systems and processes.

According to different aspects of the invention, the above mentioned and other objects are achieved by a method for electronic data interchange messaging, an electronic data interchange messaging system, a system for designing an electronic data interchange messaging process, and an article of manufacture as defined in the accompanying claims.

Hence, a computer software application according to the invention preferably comprises: a data definition defining the information that has to be successively stored and recalled by the application, said data definition being used for data mapping in relation to incoming/outgoing messages; a process describing the expected sequence of messages, event rules to be applied on the message data for detection of certain conditions, timers supervising deadlines of certain events or updates, and events to be issued due to timer expiring or other conditions; data mapping from message data to application data (IMA data); and data mapping from application data (IMA data) to event data when issuing an event. In this context, and according to the invention, terms such as electronic data interchange, electronic data interchange message, and the like refer to electronic messages comprising and transferring data provided in a predefined, preferably standardized structure or form in such a way that said data may be identified and used as data element values or strings in further processing functions by the receiving system or application. The term process execution is in the context of the present invention referring to the execution of a process from its initial start all the way to its end. That is, the executional steps made by a process after an event causes the process to resume execution, or before an event causes the process to make a temporary halt in the execution, are not considered as a process execution, but merely as a part thereof.

Consequently, a regular email text body, for example, does not constitute an electronic data interchange message according to the invention unless the body comprises data arranged in a predefined structure so that the receiving system or application may derive or extract said data therefrom. Note however that this does not mean that the sending/receiving of such unstructured text bodies may not be included in a process according to the invention, as an addition to the sending/receiving of true electronic data interchange messages.

A computer application according to the invention provides an electronic data interchange process working in intimate interaction with a data instance of a data definition associated with the specific process. The data definition for the process is defined in advance and is set to include primarily such data that are needed in downstream steps in the process.

In general, a process as a whole may deal with an amount of incoming or outgoing data, either in relation to electronic data interchange messages or in relation to a relational database, such as a SQL (Standard Query Language) database, or other formats, as well as processing data derived and/or used in the process itself. Some of these data are often needed for use in downstream steps in the process. According to the invention, it is preferable not to store such data in a SQL database, at least not exclusively, since this will require more access time in retrieving the data when needed for use in said downstream steps. The use of a SQL relational database requires the execution of a series of request or query steps for retrieving of the desired information.

Instead, according to a preferred embodiment of the invention, such data is preferably stored in a process specific, sequential and collected data instance of a process data definition, preferably stored in a sequential file system, preferably using predefined indices, so as to be easy and fast retrievable for the process execution.

Hence, a data definition, including a set of data elements to be provided with data need for expedient execution of the entire process, is defined in advance in relation to the definition of the process. Preferably, a new data instance of the data definition is created for each execution of the process. Also, all or part of the information successively provided in the data instance may be e.g. stored in a relational database at the end of the process, thereby reducing need for real-time process-database-interaction.

As a result of the use of a time sequential file system for storing said data instance, there is no need for mapping of data to and from a database, and also no need for SQL searches to find data for a specific process case.

As mentioned, in prior art, data received in for example a transportation order message is consecutively stored in one or more tables in a database, each table comprising a list of rows corresponding to all received transportation orders. Data provided in a later received delivery confirmation, for example, is consecutively stored in one or more rows relating to one or more tables in the database, each table comprising a list of rows corresponding to all received delivery confirmations. According to this prior art, non of said tables provides information as to the overall processed case, merely to one part of the overall process case. Also, the use of a relational database for storage requires requesting and data mapping programs intermediate the process and the database. These features contributes to reducing the efficiency of the database-process-interaction.

As the data instance, preferably stored in a sequential file system, will be successively provided with electronic data interchange messaging data as the process proceeds, the data instance may be said to represent the entire process in a time flow perspective. The invention solves the problem of how to store and look up data that are related to a series of predefined activities in a specific process case. The invention hence provides a better control of the process time perspective.

According to another aspect of the invention, an electronic data interchange process of the kind mentioned above is constructed using a limited set of function blocks of the kind disclosed herein. According to a preferred aspect, said function blocks may be visualized on a computer monitor in the form of symbols, each symbol being associated with a respective function block. When performing the task of constructing, managing, rebuilding or using an electronic data interchange process, a user of such a system will be able to associate the desired symbols on the screen via user interface, thereby instructing the computer system to associate the corresponding function blocks in a similar manner and consequently forming an assembled process.

Two or more function blocks forming an entire process or part thereof can preferably by grouping to a composite function block being more complex than the original function blocks. A user accomplishes this through the user interface by grouping at least two existing symbols, each symbol being associated with a respective function block, to a new symbol definition to be stored preferably together with the existing symbol definition resources of the system. The user also has the possibility to add one or more data definitions comprising one or more set of data elements to the new symbol definition. In this way the solution to a complex problem, and the design thereof, can be stored in a repository for future distribution or modification in connection with designing an electronic data interchange messaging process.

It has been found that the use of a set of function blocks as the one described below with reference to the drawings provides a very easy understandable and easy implementing process model. The invention provides a better understanding of how a process shall be implemented and how a process may be changed to be more efficient.

Therefore, one advantage of the invention is that it provides simplified transformation of a process design into a technical implementation, whereas prior art techniques make this transformation very difficult. Another advantage of the invention is that it saves time and costs with respect to the process design, the technical implementation, as well as the maintenance and processing of the system. The invention also makes it easier to connect process design activities and process implementation activities.

According to another aspect of the invention, there is provided a synchronizing function comprising: to define a expected number of events; to count the number of occurred events; and to end said function as soon as one of the following two conditions are fulfilled: a) said number of occurred events is equal to said expected number of events; b) a synchronizing timer is expired. The synchronizing function preferably includes one or several of the following function blocks: a waiting block executing the function of stopping the process in awaiting whichever comes first: the occurrence of a predefined number of expected events or the expiring of a timer; a message sending block executing the function of sending an electronic data interchange message and setting a timer to be used in a following synchronizing block, said message comprising information stored in at least one data element of a data instance of said data definition. Other preferred function blocks include: a starting block performing the function of awaiting the receiving of an electronic data interchange message and storing data included in said message in at least one designated data element of a data instance of said data definition; and a starting block performing the function of allocating a data instance of the data definition for the execution of the process. This kind of function blocks provide a preferable alternative when designing and constructing electronic data interchange process. Also, a function block of the kind mentioned above, performing this synchronization function, makes it possible to simplify the application design and achieve synchronization of electronic data interchange processes, as will be described further with reference to the drawings. Hence, the invention also provides an advantageous means for synchronizing electronic data interchange message activities.

As is understood by one skilled in the art of computer programming, the processes, systems and functions disclosed herein is easily implemented and realized as a computer software application based upon the knowledge provided by the inventive features and exemplifying embodiments disclosed herein, thereby setting aside the need for more detailed description thereof.

Further aspects, objects, advantages and features of the invention will become apparent from the following description of exemplifying embodiments thereof and from the accompanying claims.

BRIEF DESCRIPTION OF THE DRAWINGS

Exemplifying embodiments of the invention will be described below with reference to the accompanying drawings, wherein.

DETAILED DESCRIPTION OF PREFERRED EMBODIMENTS

Figure 1:
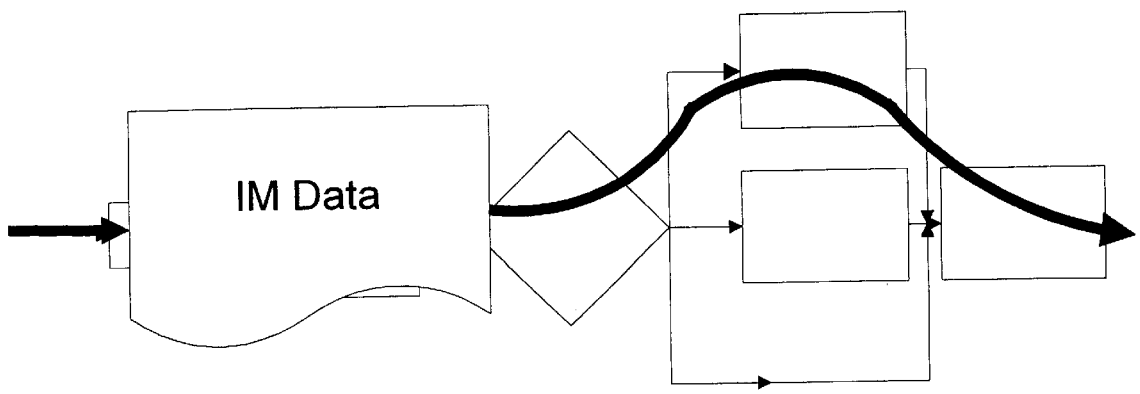
FIG. 1 shows an emblem of an Intelligent Messaging Application, IMA, according to the present invention.

FIG. 1 shows an emblem of an Intelligent Messaging Application, IMA, according to the present invention. The application may be viewed as an underlying messaging process, involving electronic data interchange, associated with an IMA process data instance following the process. The intelligent messaging application is a special type of application that helps synchronize EDI message activities ties (messages to/from applications and to/from persons) into one manageable process. Most of the activities in the intelligent messaging application are automated processing of information, although the processing in single cases may involve manual interaction. According to the invention, an intelligent messaging application, comprising an electronic data interchange process, hence includes one or more electronic data interchange message dialogs between difficult computer systems or applications.

Figure 2:
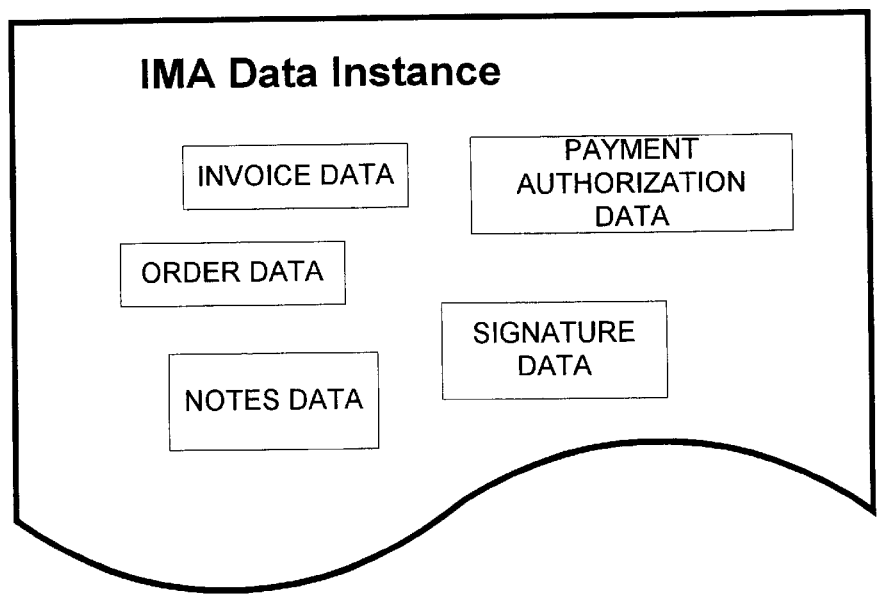
FIG. 2 shows an emblem of an intelligent messaging data instance according to the invention.

FIG. 2 shows an emblem of an Intelligent Messaging Application data instance (IMA data instance) according to the invention. The data instance is a collection of data which is related to a specific case in a process, such as a business process, a transportation process or a technical process. For example, the data instance may include a collection of all data that is related to, and essential for, the control and attest of an invoice, the control of a work flow of a production factory or machine, or the like, such control involving electronic data interchange. In the case of invoice control and attest, the data instance may include the invoice data, the order data related to the invoice, payment authorization data, signature data and notes data made by the person attesting the invoice. According to the invention, as is described below, the data instance will follow a flow, or process, in an intelligent messaging application. The application is preferably designed so as to be able to handle several data instances at the same time. An IMA data instance is preferably created based upon an underlying data definition every time an electronic data interchange message or another type of event, such as the expiring of a timer, the receiving of a clock signal or the changing of a monitored state starts an electronic data interchange process. In some kind of processes the process work flow will dynamically change depending on decisions taken in the process. Hence, the data in the data instance will change accordingly for every IMA data instance. During the process execution, the application can add, change and remove information to/from the data instance. Preferably, every data instance is given a unique reference number.

Figure 3:
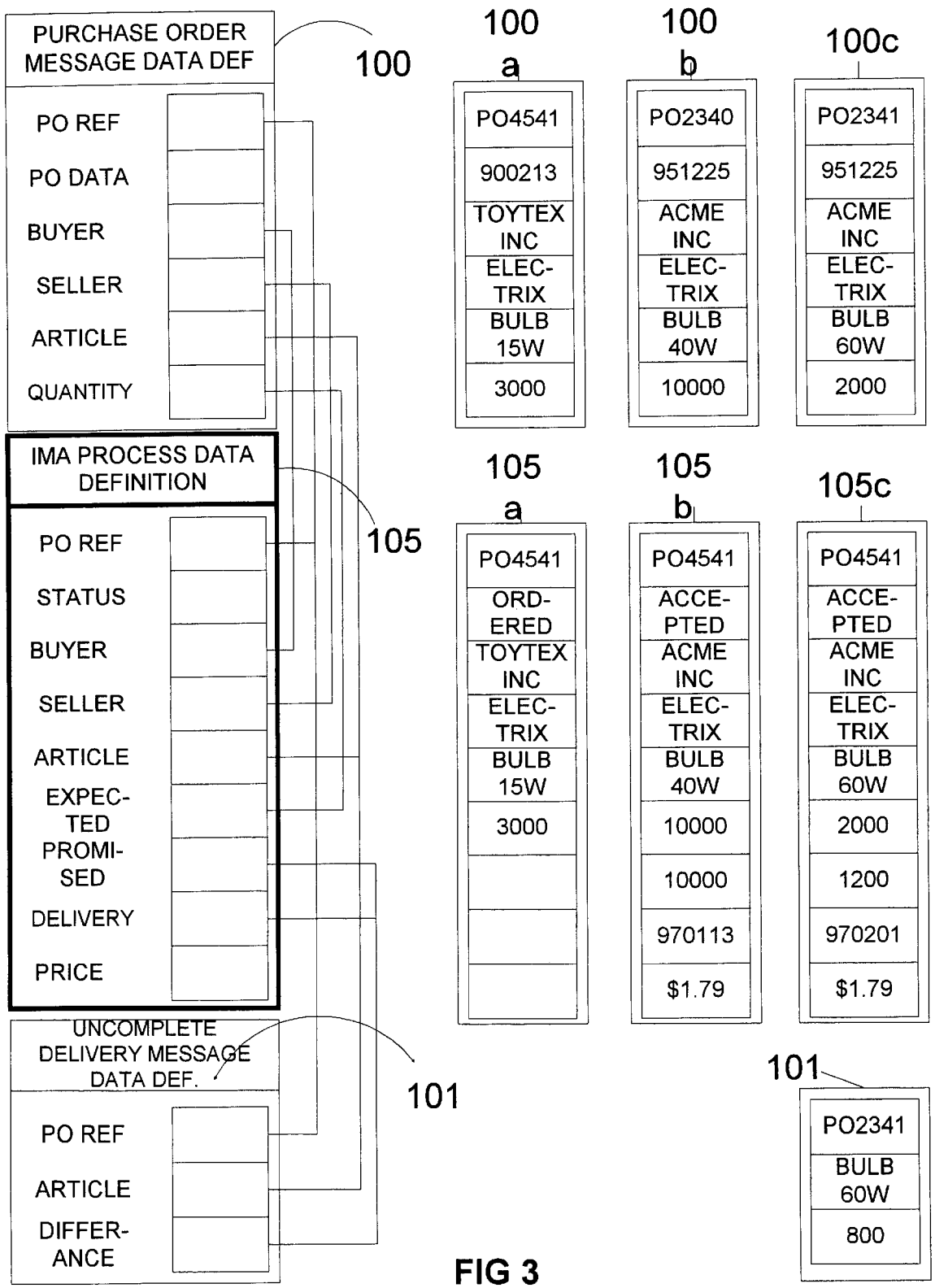
FIG. 3 shows an example of a data definition and data instances thereof in relation to an exemplifying electronic data interchange process.

An advantage of intelligent messaging according to the invention is the ability to manage data according to a certain pattern of work flow. FIG. 3 shows an example of the relationship between data received or transmitted in electronic data interchange messages in a process, data mapping, a data definition for the process and data instances of the data definition according to the invention.

In FIG. 3, an IMA process data definition 105 relates to a predefined electronic data interchange process (not shown), in this case a purchase transaction process. At one step in the process, the application is to receive a purchase order from a buyer in the form of an electronic data interchange message. This message will contain purchase order data in a predefined structure according to a purchase order message data definition 100. Hence, purchase data will be provided in a structured, predefined manner in the purchase message, thus enabling the application to derive the purchase data from the message. In the example shown in FIG. 3, the purchase order message data definition 100 will include, according to the predefined structure, a purchase order reference (PO ref), a purchase order date (PO date) a designated buyer (Buyer) (in the case the sender of the message), a designated seller (Seller) (in this case the receiver of the message), an ordered article (Article) and a quantity (Quantity) thereof. When constructing the process, it has been decided that only the PO ref, Buyer, Seller, Article and Quantity data of the purchase order data definition need to be stored in data instance 105a, 105b, 105c of the IMA process data definition 105, each data instance 105a, 105b, 105c corresponding to a respective execution of the process. Hence these five entities are to be mapped into a data instance of the IMA process data definition 105, as is indicate by the box connecting lines in FIG. 3.

At a later step in the process, the application is to send an Uncomplete Delivery message to the buyer, also in the form of an electronic data interchange message, in case the seller cannot deliver the ordered quantity at the delivery date. Hence, this Uncomplete Delivery data will also be provided in a structured, predefined manner in the Uncomplete Delivery message based upon a predefined Uncomplete Delivery message data definition 101. In the example shown in FIG. 3, the Uncomplete Delivery message data definition includes the purchase order reference (PO ref), the ordered article that was uncomplete (Article) and a calculated difference (Difference).

Before these three entities of the Uncomplete Delivery message data definition are fetched from the IMA data instance to the Uncomplete Delivery message, an automated function block, to be described further below with reference to FIG. 4c, will decide how many articles that actually can be delivered and then update the IMA data instance with such data, i.e. the promised number of articles (Promised), the promised delivery date (Delivery), and the agreed prize (Prize).

Based upon the updated IMA data instance, the data to be contained in the Uncomplete Delivery message may be derived and mapped from the data instance of the IMA data definition 105 into the EDI message, in this case using process logic to calculate said difference.

When constructing the entire process and the related IMA process data definition 105, the entire process for example comprising further steps than the one described above, it has been decided in the example shown in FIG. 3. that the IMA process data definition shall contain the entities PO ref, Status, Buyer, Seller, Article, Expected, Promised, Delivery and Price. Hence, the IMA process data definition preferably defines such information that has to be recalled by the application in later steps in the process.

Further, in FIG. 3, there are shown three examples of executions of the process. In the first example (a), a purchase order 100a has been received by the application, designating the ordering of 3000 15 w light bulbs. The data instance 105a of the IMA process data definition 105 shows the situation when merely having received this purchase order message. Hence, it can be seen that no promised delivery has been made and the status of the IMA data instance is "Ordered" (IMA process not complete).

In the second example (b), a purchase order 100b has been received by the application, designating the ordering of 10000 40 w light bulbs. The IMA data instance 105b of the IMA process data definition 105 shows the situation when having accepted this order. Since in this case it has been decided in the process that the delivery can be made at a given date, the order has been accepted without the need to send any Uncomplete Delivery message. Hence, it can be seen that a promise of a delivery of 10000 units on Jan. 13, 1997 at the price of $1.79 has been made and that the status of the data instance is "Accepted" (IMA process complete).

In the third example (c), a purchase order 100c has been received by the application, designating the ordering of 2000 60 w light bulbs. The IMA data instance 105c of the IMA process data definition 105 shows the situation when having accepted this order. Since in this case it has been decided in the process that a complete delivery cannot be made at the moment, the order has been accepted with a reservation in the form of an Uncomplete Delivery message 101c. Hence, it can be seen that a promise of delivery of 1200 units in Feb. 1, 1997 at the price of $1.79 has been made, resulting in an Uncomplete Delivery Message designating the difference of 800 60 w light bulbs, and that the status of the data instance is "Accepted" (IMA process complete).

As is understood from the example in FIG. 3, each execution of the process, i.e. each purchase transaction, is associated with a respective data instance of the IMA process data definition. Also, as the process goes on, each IMA data instance is successively provided with information preferably to be used in later processing steps, wherein data in some data elements of the data instance may change during the process.

FIG. 4a–4h shows different function objects, symbols or blocks to be used in an electronic data interchange process according to the invention. The set of function blocks shown in FIG. 4a–4h has been found to be very advantageous when used to form complete electronic data interchange processes.

Hence intelligent messaging applications and processes are preferably developed and constructed using the function blocks described below. The function blocks in FIG. 4a–4h have generic functionality and becomes specialized when put into a specific process or application.

Figure 4A:
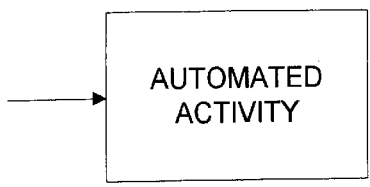
FIG. 4a–4h show different function blocks to be used in an electronic data interchange process according to the invention.

FIG. 4a shows an automated activity function block. An automated activity function block performs at least one predefined function in relation to the IMA data instance associated with the present execution of the process. The predefined function may for example include the performing of an automated logical operation on the IMA data instance, for example using of some type of programming code (C, C++, Java), the addressing of another routine, the creation of the IMA data instance, or the like.

Figure 4B:
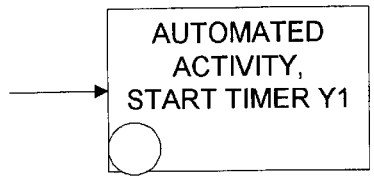

FIG. 4b shows an automated activity, start timer function block. An automated activity, start timer function block performs at least one predefined function in relation to the IMA data instance associated with the present execution of the process, as is discussed above with reference to FIG. 4a, and starts a timer (timer y1 in FIG. 4b). The automated activity, start timer function may for example: create the IMA data instance if the automated activity, start timer function is placed first in the process; declare an event and start a timer telling that within a certain time frame a specific event is supposed to happen (which will be discussed further with reference to FIG. 4h below).

Figure 4C:
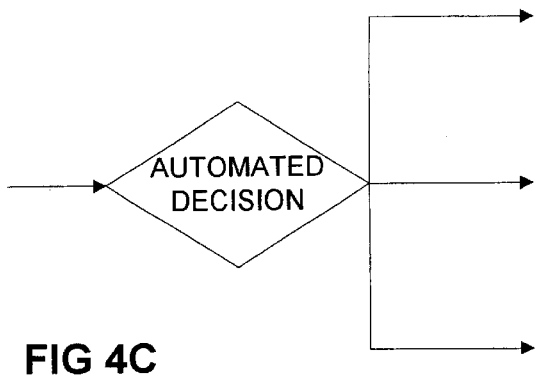

FIG. 4c shows an automated decision function block. An automated decision function block will dynamically change the flow of the data instance through the process. The change of the flow is based upon a predefined rule, for example the flow will change in relation to the outcome of an automated logical or arithmetic operation on the IMA data instance. The rule is setup in the automated decision function block and preferably uses data in the IMA data instance associated with the present execution of the process. Even though three outcome or outgoing process paths from the automated decision function block are shown in FIG. 4c, the true number of outcomes or outgoing process paths is arbitrary and may be set in dependence of desired process. Each outgoing process path will lead to the issuing of new events.

Figure 4D:
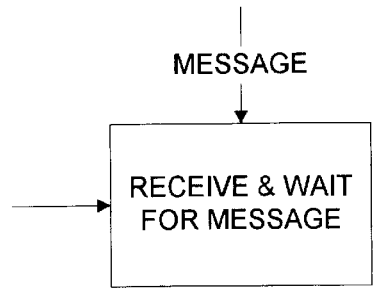

FIG. 4d shows a receive and wait for message function block. A receive and wait for message function block will wait for an electronic data interchange message and, when this is received, load the IMA data instance associated with the present execution of the process with data received in the message. A receive and wait for message function block is often preferably placed first in an electronic data interchange process according to the invention. If placed first in the process, the receive and wait for message function block preferably also creates the IMA data instance associated with the present execution of the process.

Figure 4E:
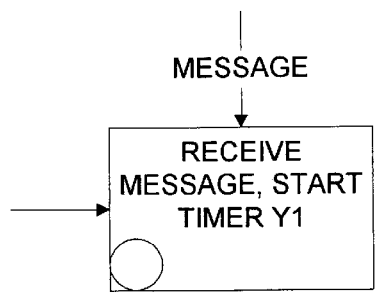

FIG. 4e shows a receive message, start timer function block. A receive message, start timer function block will start a timer set to a predefined time frame (timer y1 in FIG. 4e) and will expect to receive an electronic data interchange message within the given time frame. Hence, the receive message, start timer function block declares the expected receiving of an EDI message and starts a timer telling that within the given time frame the message is supposed to be received. If the message is not received within the given time frame, an exemption event will be generated, as will be discussed further with reference to FIG. 4h below. The receive message, start timer function block, as well as the other blocks disclosed herein, will also provide the required mapping rules for transferring message data from the message to the IMA data instance.

Figure 4F:
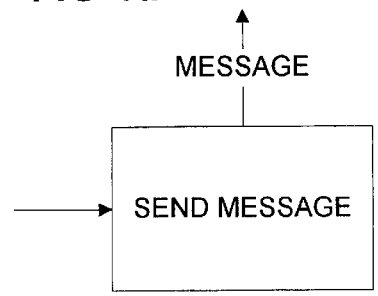

FIG. 4f shows a send message function block. A send message function block will send an electronic data interchange message and preferably use data stored of the IMA data instance associated with the present execution of the process to create the message to be sent. Hence, as discussed above, the function block will provide the required mapping rules for transferring message data from the IMA data instance to the message.

Figure 4G:
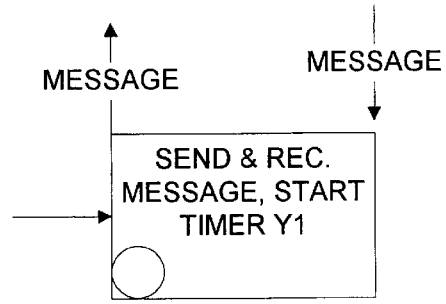

FIG. 4g shows a send and receive message, start timer function block. A send and receive message, start timer function block will perform exactly the same functions as the send message block (FIG. 4f) and the receive message, start timer function block (FIG. 4e) put together. Hence, the send and receive message, start timer function block will send an electronic data interchange message, start a timer set to a predefined time frame (timer y1 in FIG. 4g), and expect to receive an answer in the form of an electronic data interchange message within the given time frame. Hence, the send and receive message, start timer function block sends and EDI message, declares the expected receiving of an EDI message answer, and starts a timer telling that within the given time frame the answer is supposed to be received. If the answer is not received within the given time frame, an exemption event will be generated, as will be discussed further with reference to FIG. 4h below.

It is understood that the function blocks discussed in relation to FIG. 4d, 4e, 4f and 4g may also be used to provide information read from a database, received via email, inputted/sent via a user interface, or inputted/sent via Java, C++, C or other programming language, to/from the data instance, i.e. not exclusively using EDI messages in the trust sense.

Figure 4H:
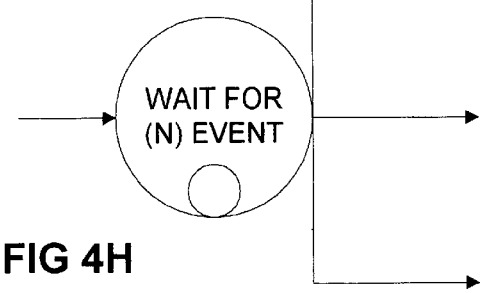

FIG. 4h shows a wait for (n) event function block according to the invention. The wait for (n) event function block will stop the process and wait for the occurrence of a predefined expected number of events or the expiring of a predefined timer setup in one or more of the above mentioned function blocks.

There are two types of events that can occur: an event that was earlier setup/declared in an automated activity, start timer function block (FIG. 4b); or the receiving of one or more messages that was earlier setup/declared in a receive message, start timer function block (FIG. 4e) or a send and receive message, start timer function block (FIG. 4g).

Hence, the process will continue as soon as the timer designated in the wait for (n) event function block expires or the number of expected events designated in the wait for (n) event function block has occurred. Hence, there are two possible outcomes of this function block: all expected events occur within the time frame given by the designated timer, and the process consequently continues events than the expected number of events occur within the time frame given by the designated timer, and the process continues as the timer expires despite the fact that not all expected events has occurred. One specific possibility of the latter outcome is that no event occur within the time frame given by the designated timer and the process continues as the timer expires despite the fact that no event has occurred. Depending on the desired process flow, the timer-expired-outcome may be designed as one single flow path or several flow paths, since this outcome may in some cases accommodate several different possibilities.

Figure 5A:
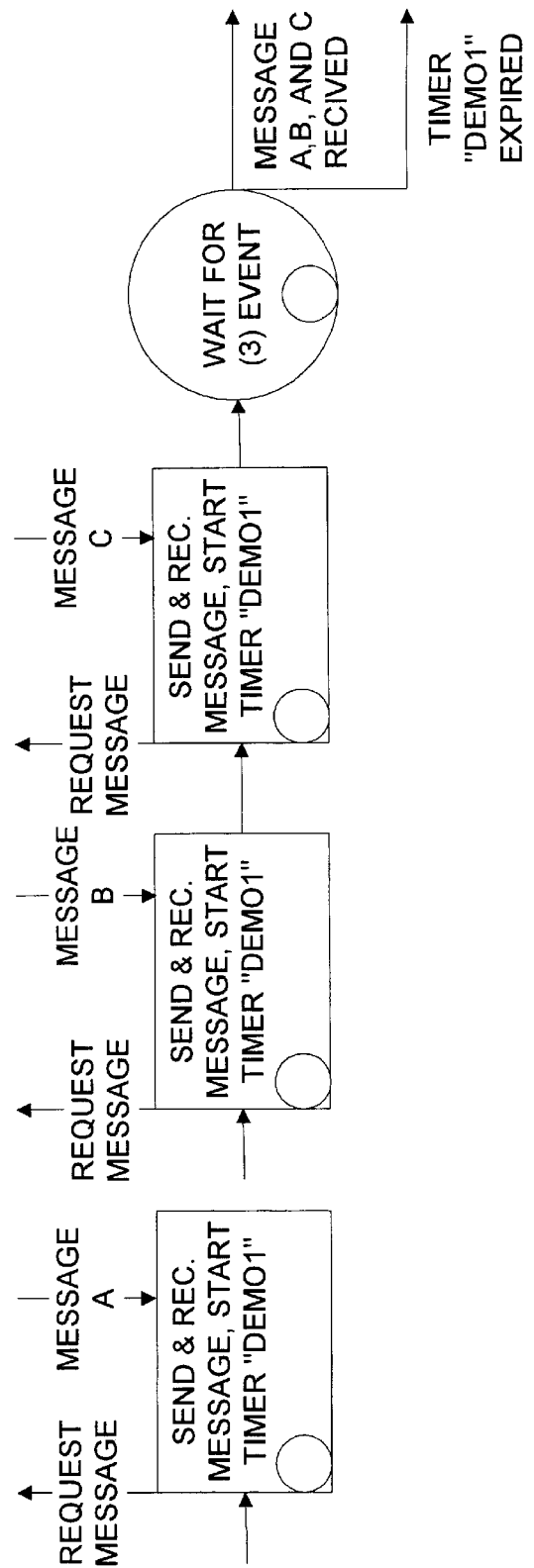
FIG. 5a, 5b and 5c show three different examples of process management of multiple answers.
Figure 5B:
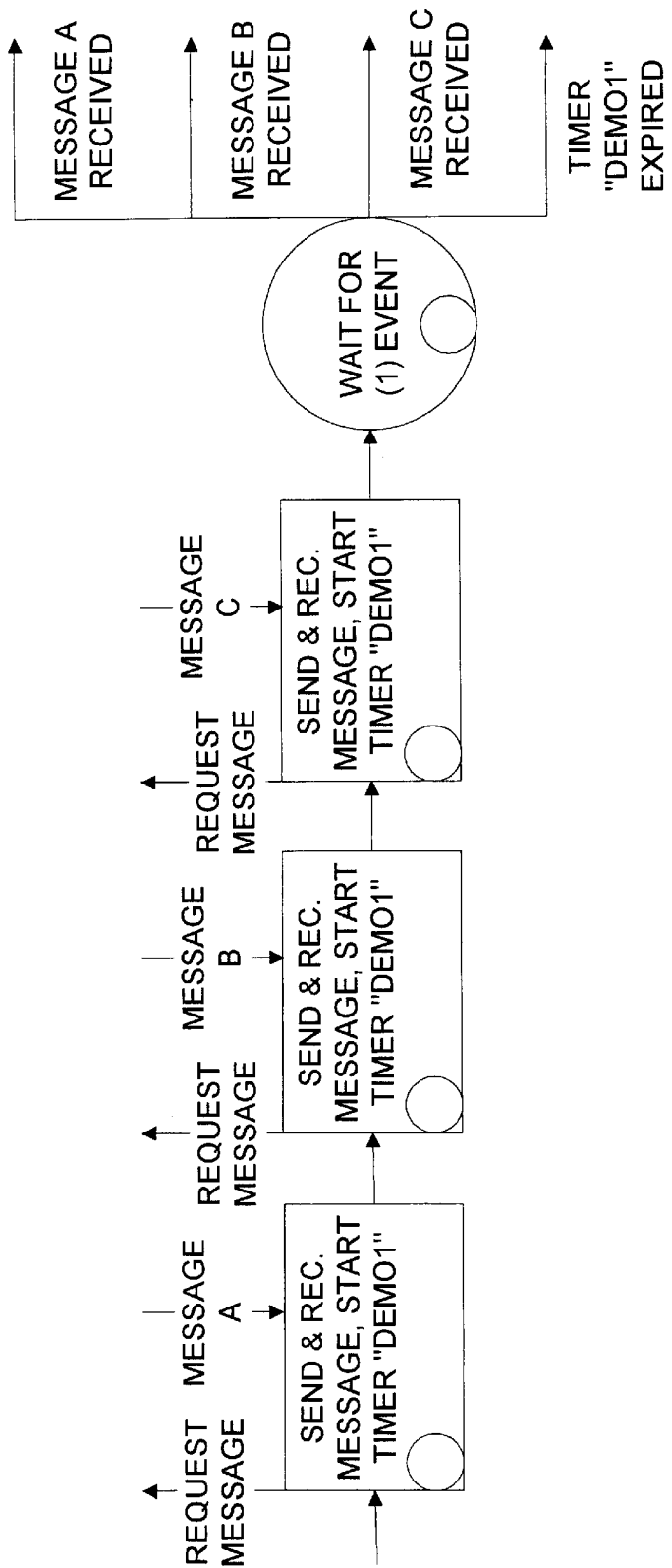
Figure 5C:
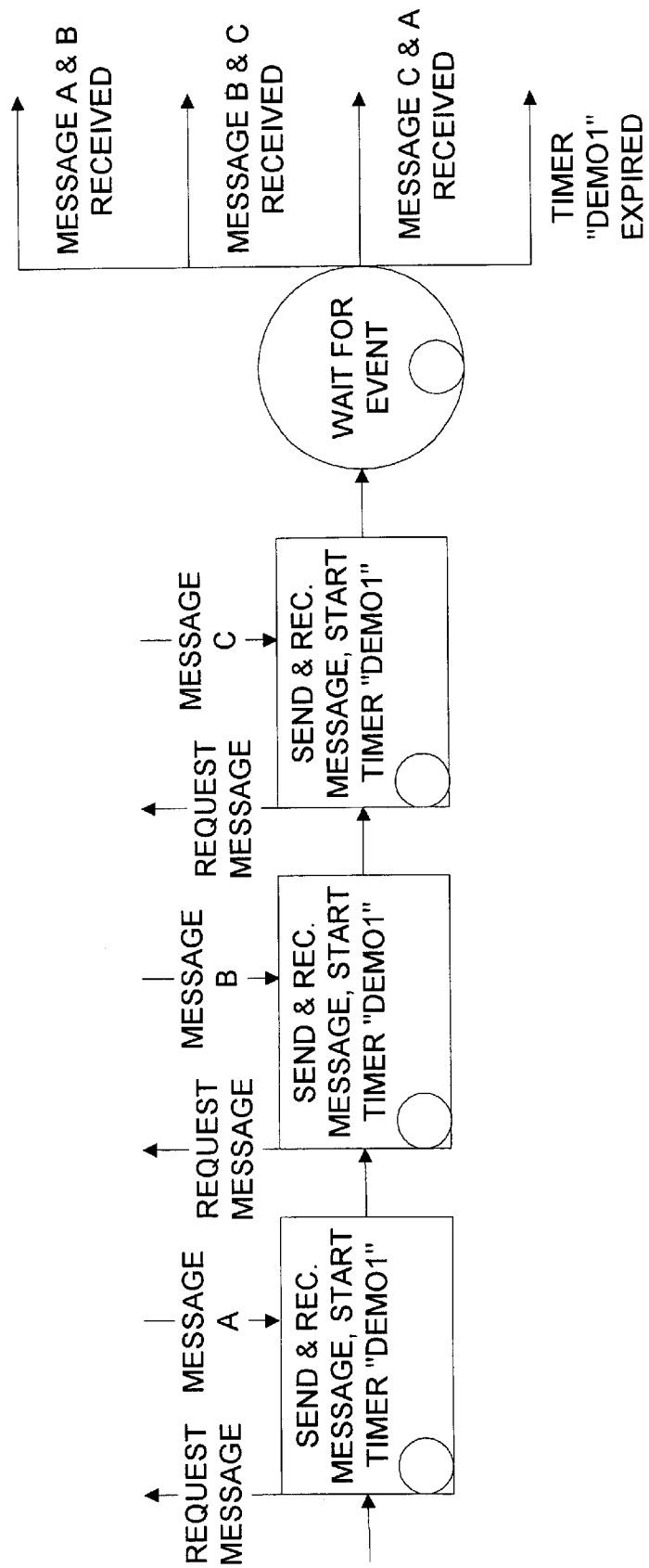

FIG. 5a, and 5b and 5c show three different examples of process management of multiple answers. In both FIG. 5a, 5b and 5c it is assumed that three send and receive message, start timer function blocks are used to request three answers to be received as message A, message B and message C, respectively, and to start a timer "Demo1".

In FIG. 5a, the wait for (n) event function block is set to wait for all three events, i.e. the receiving of all three messages, in consideration of the timer "Demo1". The process will follow two different paths, a first path if all three messages are received before the timer expires and a second path if the timer expires before all three messages have been received. The second path hence accommodates three possibilities: the timer expires after the receiving of two messages; the timer expires after the receiving of one message; or the timer expires before the receiving of any message, even though these three possibilities have been illustrated as one single outcome.

In FIG. 5b, the wait for (n) event function block is set to wait for only one event of the three events, i.e. the receiving of only one message, in consideration of the timer "Demo1". Hence, the process will follow four different paths: a first path if message A is received first and before the expiring of the timer; a second path if message B is received first and before the expiring of the timer; a third path if message C is received first and before the expiring of the timer; and a fourth path if no message is received before the expiring of the timer.

In FIG. 5c, the wait for (n) event function block is set to wait for only two event of the three events, i.e. the receiving of only two message, in consideration of the timer "Demo1". Hence, the process will follow four different paths: a first path if messages A and B are received first and before the expiring of the timer; a second path if messages B and C are received first and before the expiring of the timer; a third path if messages C and A are received first as and before the expiring of the timer; and a fourth path if no message or only one message is received before the expiring of the timer.

As is understood by the example in FIG. 5a and 5b, the wait for (n) event function block makes it possible to manage multiple events in many different ways, creating different types of process paths and configurations.

Figure 6A:
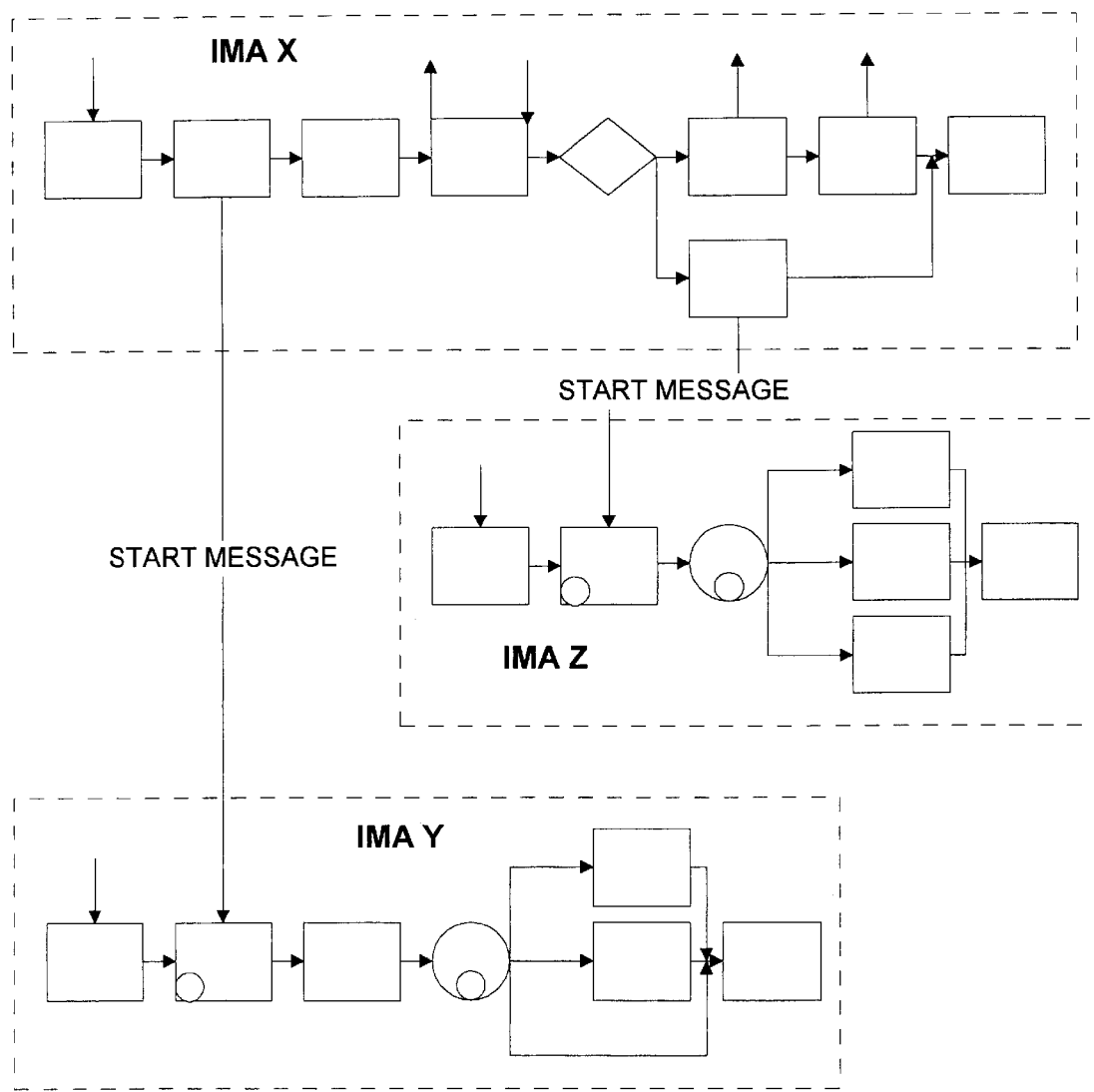
FIG. 6a, and 6b show two different ways of providing synchronization and management of parallel electronic data interchange processes.
Figure 6B:
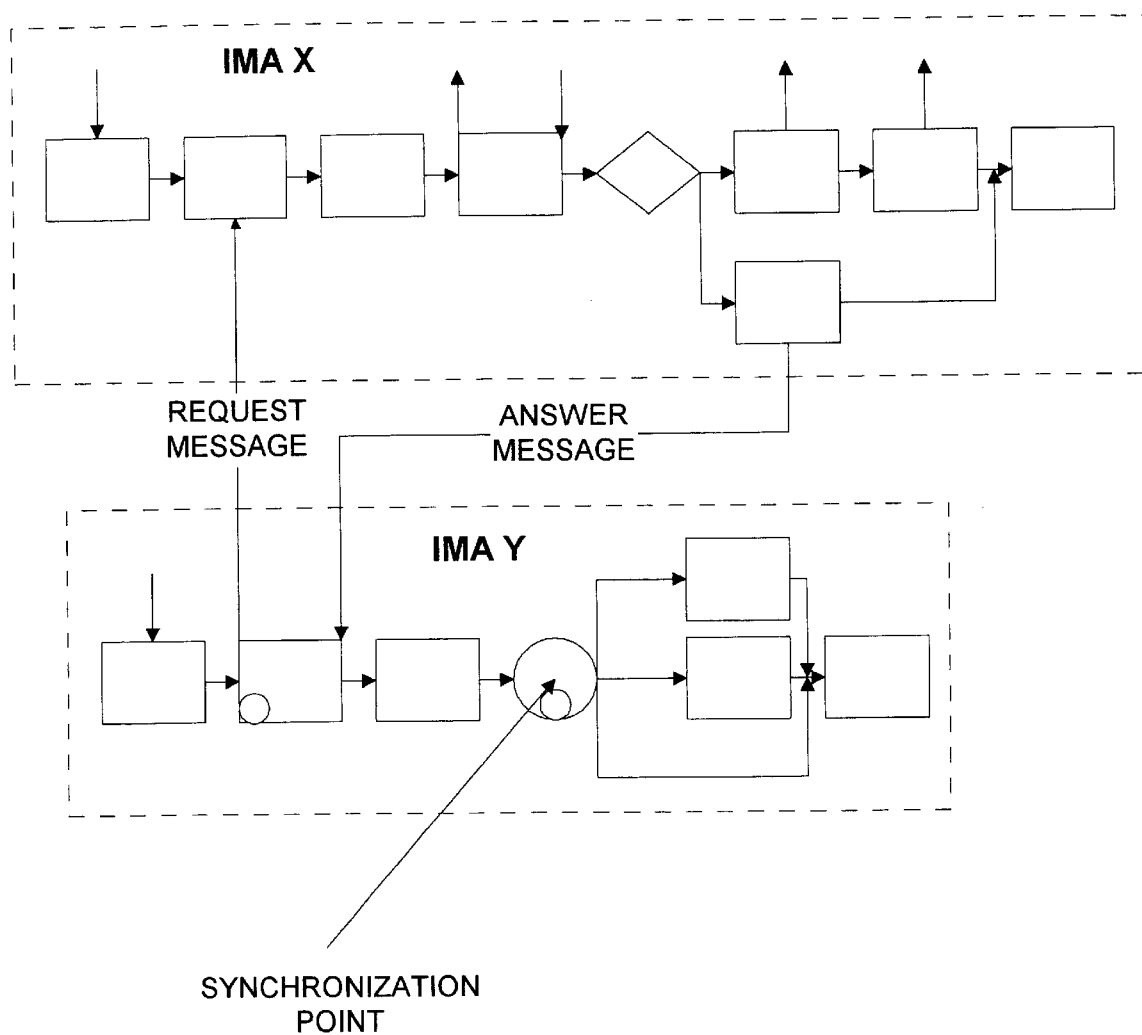

FIG. 6a and 6b shows two different ways of providing synchronization and management of parallel electronic data interchange processes according to the invention. In FIG. 6a, a first electronic data interchange process IMAx starts two parallel electronic data interchange processes, IMAy and IMAz, by sending two starting messages thereto. Hence, the processes IMAy and IMAz are preferably started by or synchronized with the first process IMAz using a receive message block such as the one shown in FIG. 4d, 4e or 4g. Another example is shown in FIG. 6b, wherein a send and receive message, start timer function block is used in a second process IMAy, together with a wait for one event function block, to synchronize the second process IMAy to a first process IMAx. As the wait for (n) event function block is of great benefit when synchronizing or controlling the process flow, this block is also referred to as a synchronizing block.

Also, as is evident from FIG. 6a and 6b, an electronic data interchange process according to the invention may be divided into two or more sub processes, and two or more processes may be put together to form an overall process. Similarly an IMA data instance may be divided into two or more sub data instances, and two or more IMA data instances may be put together to form an overall IMA data instance, all depending on the actual application and situation.

Figure 7A:
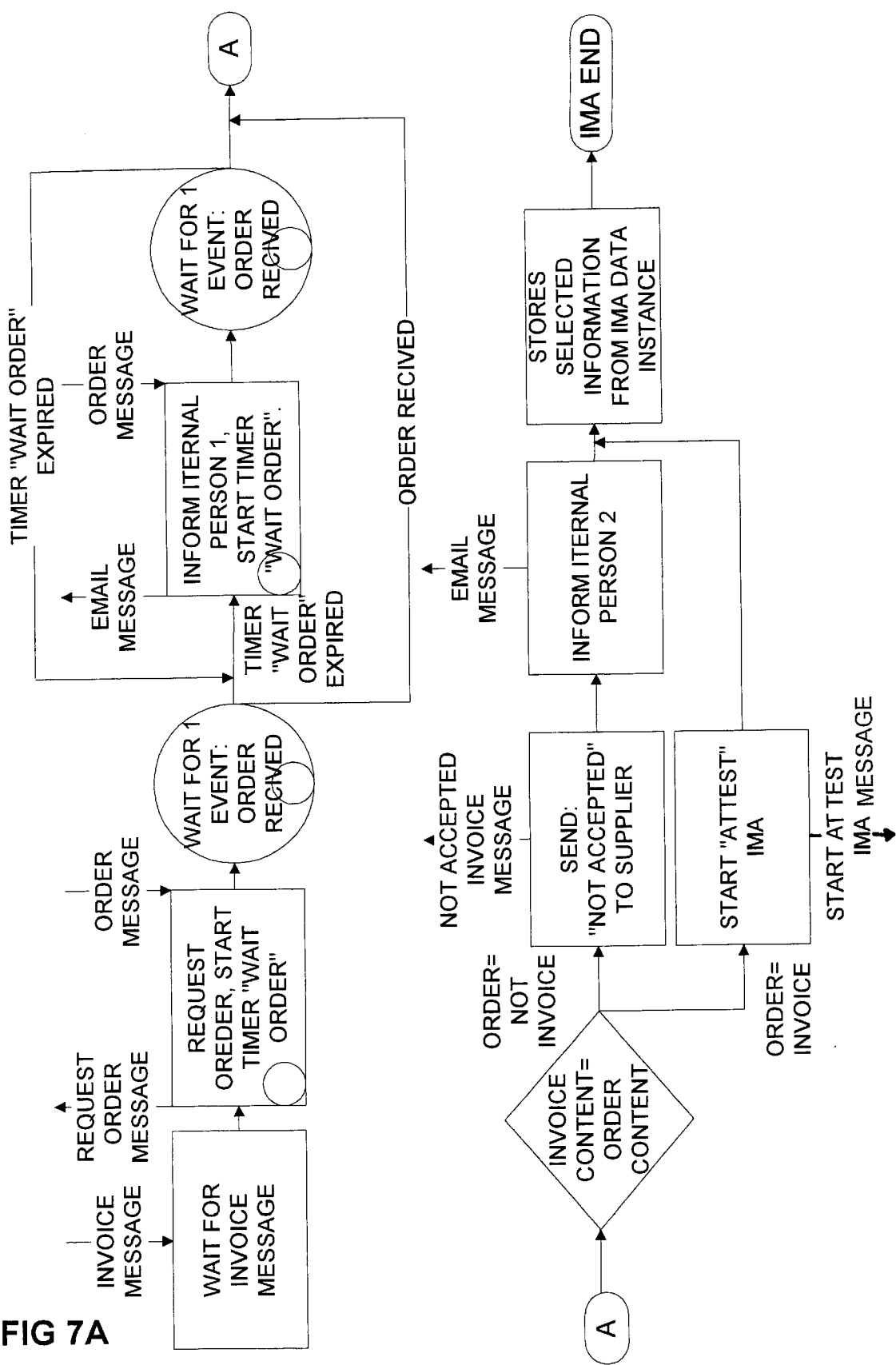
FIG. 7a and 7b show two exemplifying electronic data interchange processes according to the invention.

An example of an electronic data interchange process will now be described with reference to FIG. 7a. In FIG. 7a, an "Invoice Control" process is started by the receiving of an invoice message in a first block, this causing the creation of an IMA data instance for the present execution of the invoice control process, the IMA data instance for example being provided with relevant invoice data. In the two following blocks, the order message relating to the present invoice message is requested from the order application to be received within a time frame set by a timer "Wait Order". If no order is received within the given time, person 1 is informed in a next block and the order waiting step is repeated. If an order is received, the process continues to an automated decision block, wherein it is decided, based upon process rules, whether or not the content of the invoice corresponds to the order. If so, an "Attest" process is started by the sending of a start attest message. However, if the content of the order does not match the invoice, an "invoice not accepted" message is sent to the supplier and person 2 is informed via email. In both cases, the created data instance is stored before the process is ended. In most of the blocks shown in FIG. 7a, the process makes use of the IMA data instance, either by writing data into the IMA data instance, as in the first and last blocks, or by reading data from the IMA data instance, as in the block deciding if the invoice content is equal to the order content.

The process in FIG. 7a will be further discussed below with reference to FIG. 8.

Figure 7B:
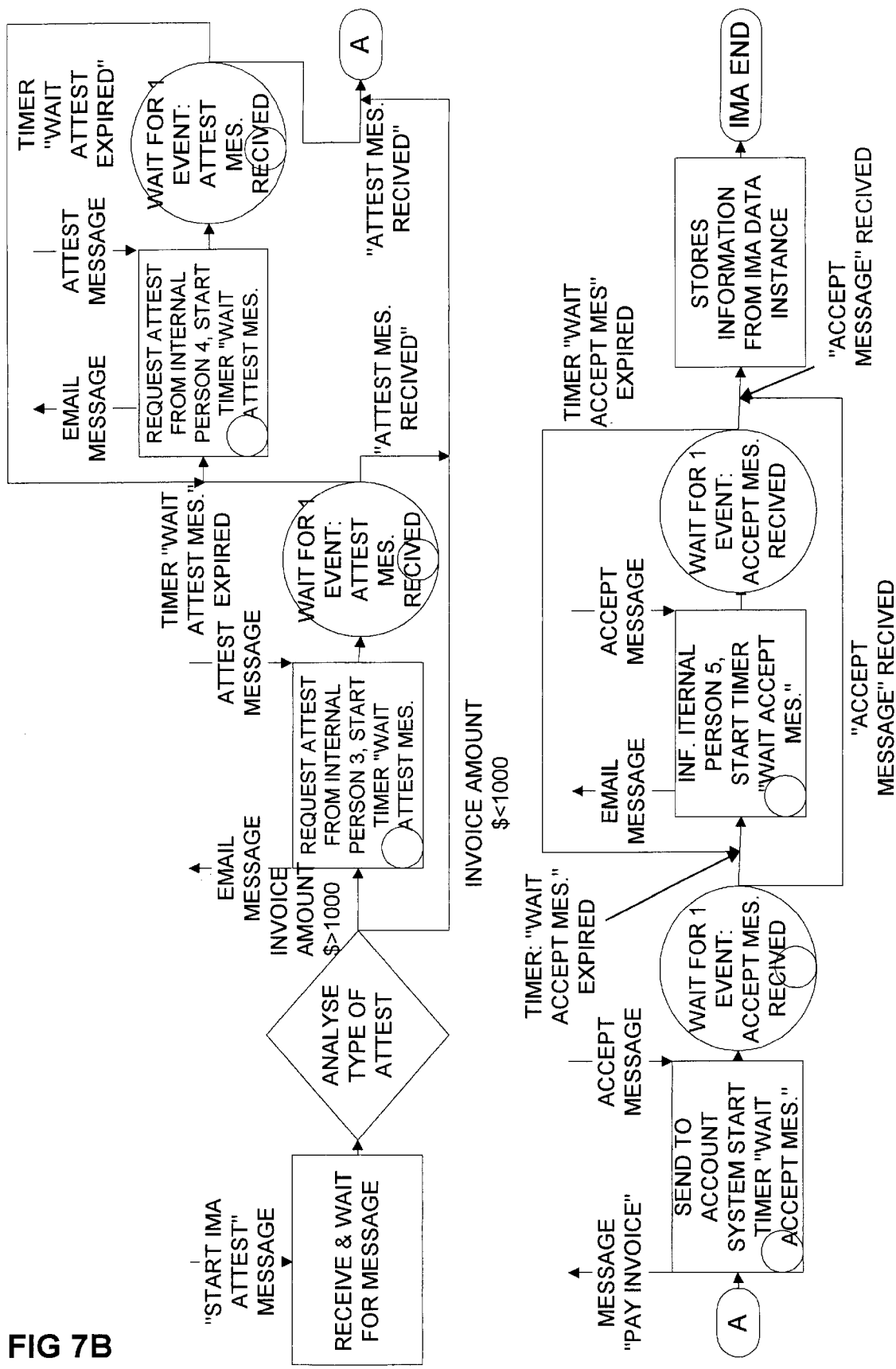

Another example of an electronic data interchange process will now be described with reference to FIG. 7b. In FIG. 7b, an "Attest" process is started by the receiving of the start attest message shown in FIG. 7a.

In this case, a new IMA data instance is created in the first block in FIG. 7b, preferably using invoice information provided in the start attest message. After having received the start attest message, the process in FIG. 7b continues to an automated decision block, wherein it is decided whether or not the invoice amounts to more or less than $1000. If the invoice refers to less than $1000, no attest is required, while relying on the already performed invoice control, and the process continues directly to a pay message block. However, if the invoice refers to more than $1000, the process goes to a block which sends an email to person 3, requesting an attest within a certain time frame. If no attest message is received within this time frame, the process goes to a similar block which sends an email to person 4, requesting the attest message. When the attest message has been received, the process continues to the above mentioned pay message block, wherein a message is sent to the account system to pay the invoice. At the same time, an accept message is requested within a given time frame, and this accept message is monitored until received. Finally, at the end of the process, information from the data instance is stored.

Figure 8:
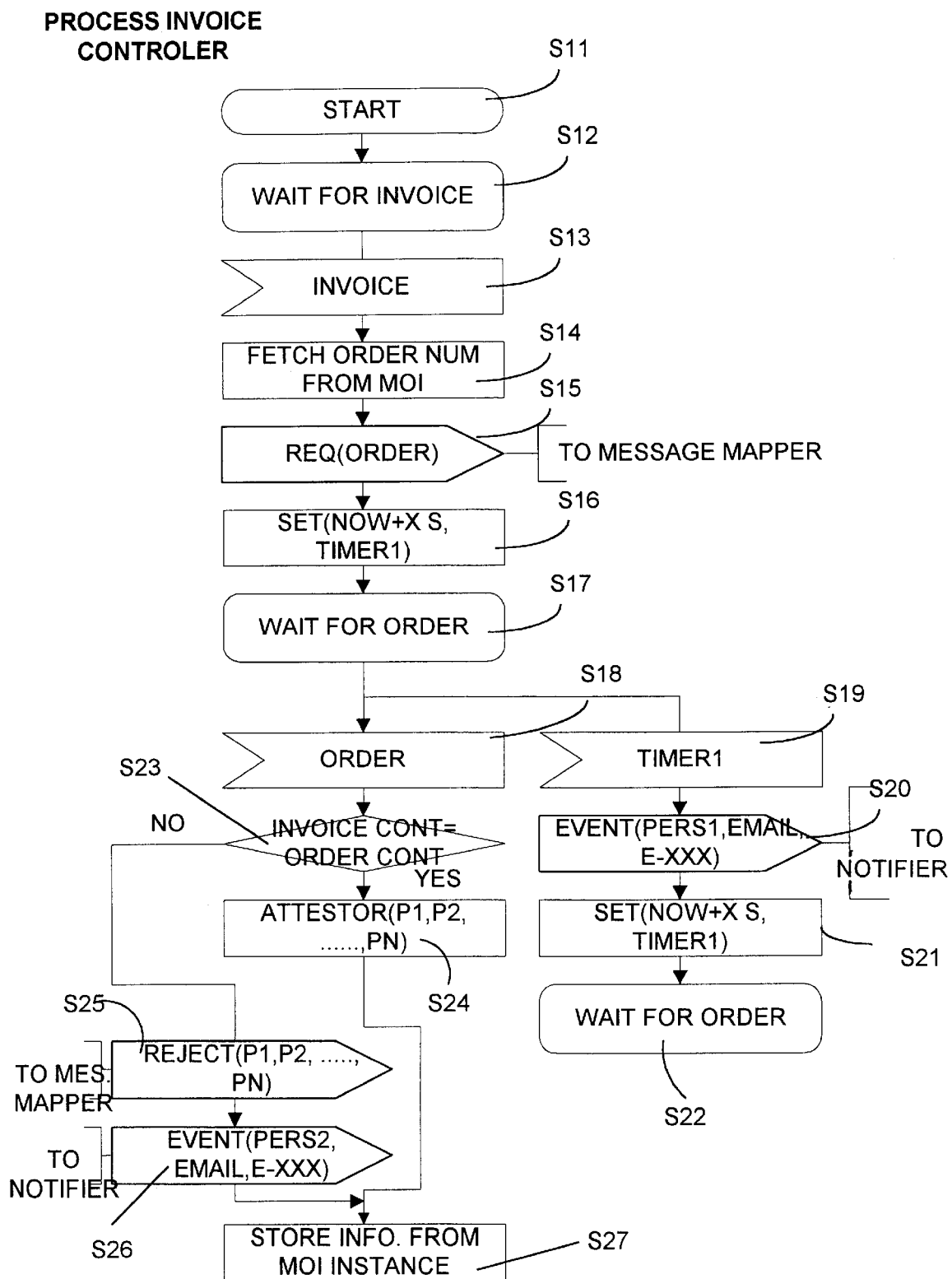
FIG. 8 shows the process of FIG. 7a using SDL symbols and language.

To emphasize that the function blocks disclosed in this application may be easily realized by one skilled in the art of computer programming, thus setting aside the need for any further elaborated description thereof, FIG. 8 shows the invoice control process of FIG. 7a when described using SDL (Specification and Description Language) symbols and language. SDL is an international standard issued by ITU-T (former CCITT), containing instructions for storing and defining the behavior of a system with parallel activities. Since the invoice attest process already has been described above with reference to FIG. 7a, and since the symbols used in FIG. 8 are well known to one skilled in the art, further description thereof will be omitted. However, it is well understood that the initial three steps S11, S12 and S13 in FIG. 8 essentially correspond to the first, invoice message receiving block in FIG. 7a, that the following three steps S14, S15 and S16 in FIG. 8 essentially correspond to the second, order message requesting block in FIG. 7a, that the following three steps S17, S18 and S19 in FIG. 8 essentially correspond to the third, wait for one event block in FIG. 7a, for example. Thus, it is easily understood by one skilled in the art how to realize for example the messaging, the synchronizing block and the timer functions according to the invention, and it is also clear that the use of function blocks according to the invention simplifies the description and construction of an electronic data interchange process.

Figure 9A:
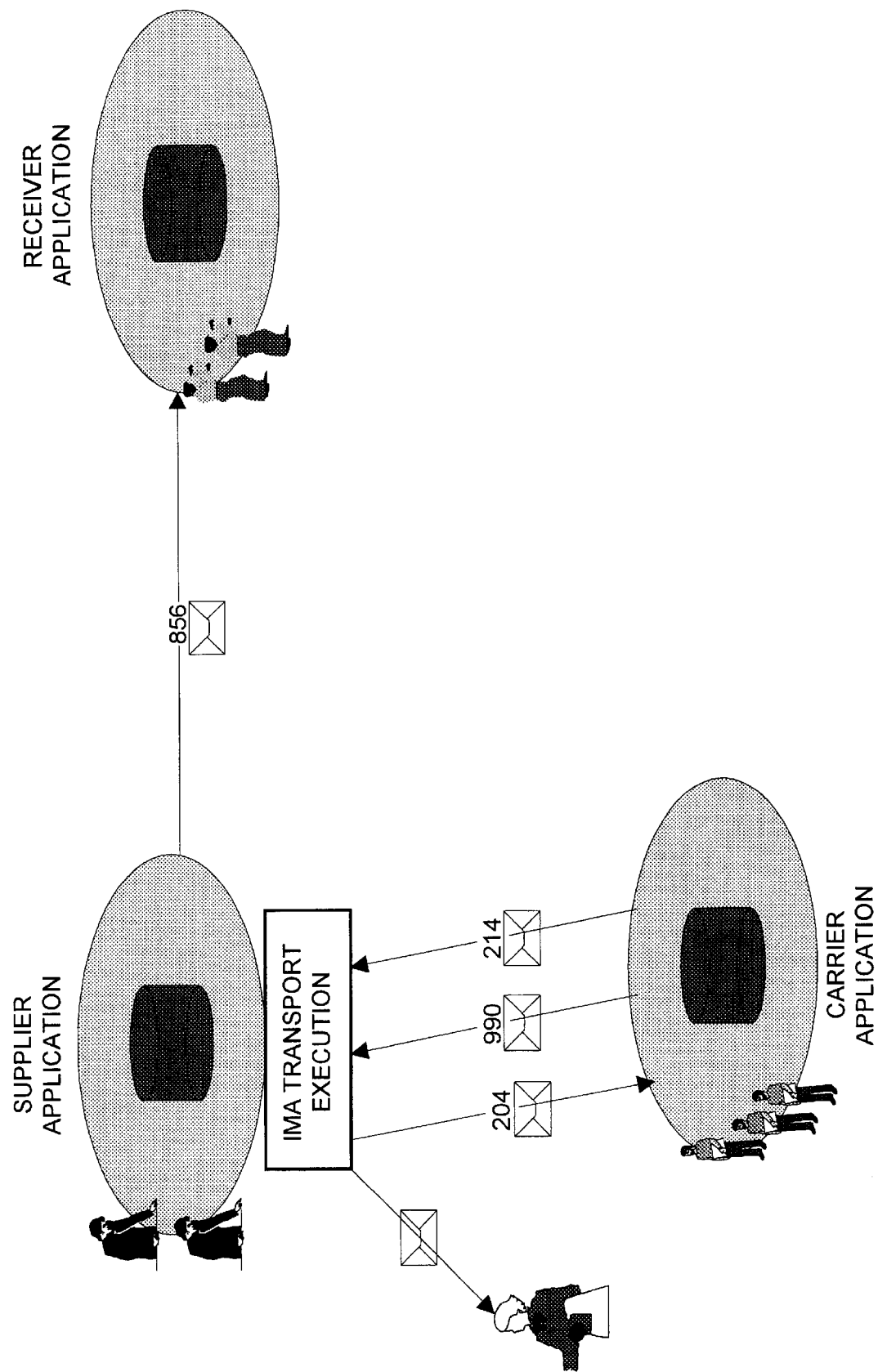
FIG. 9a–9e show another example of an electronic data interchange process according to the invention.
Figure 9B:
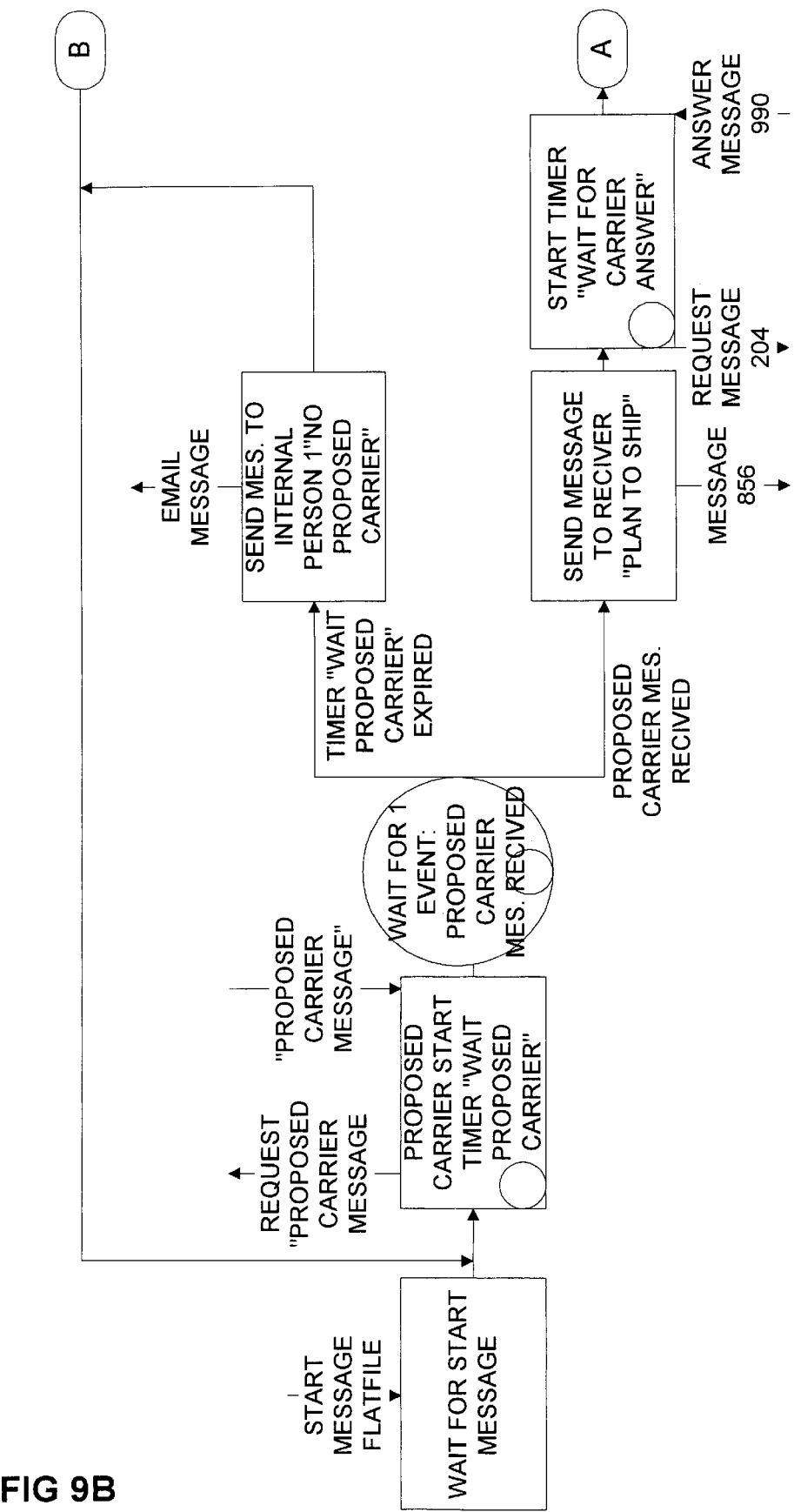
Figure 9C:
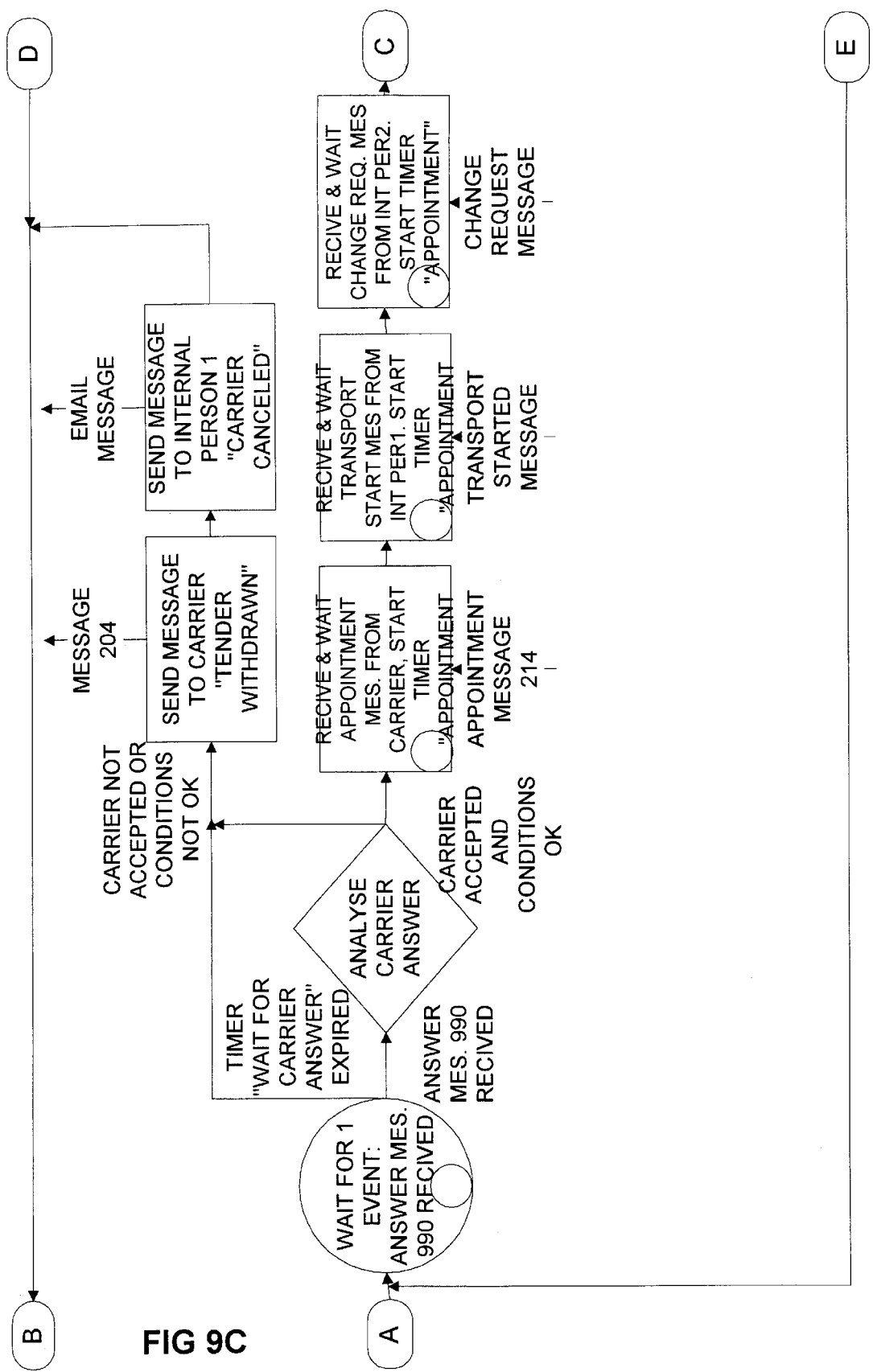
Figure 9D:
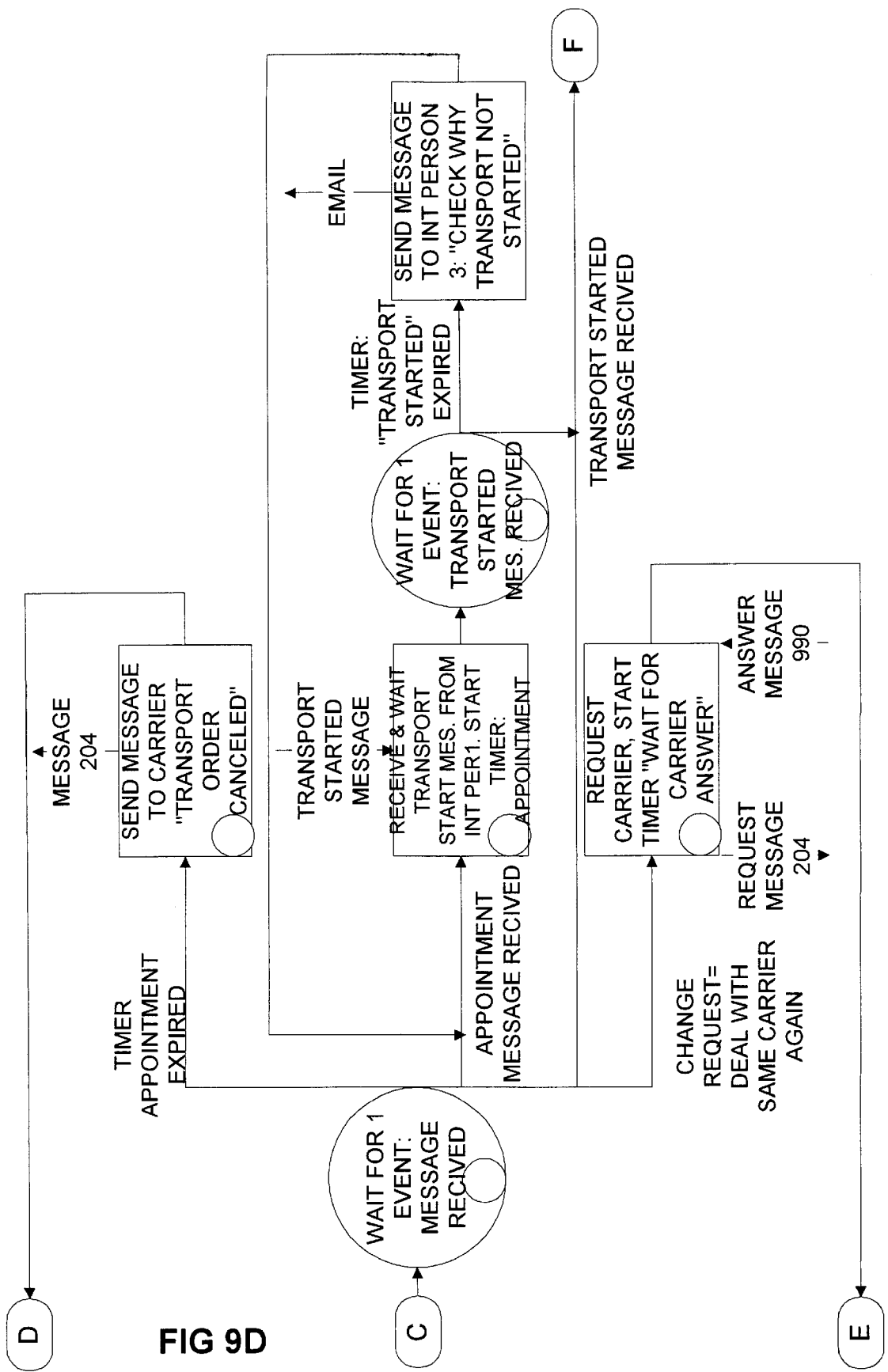
Figure 9E:
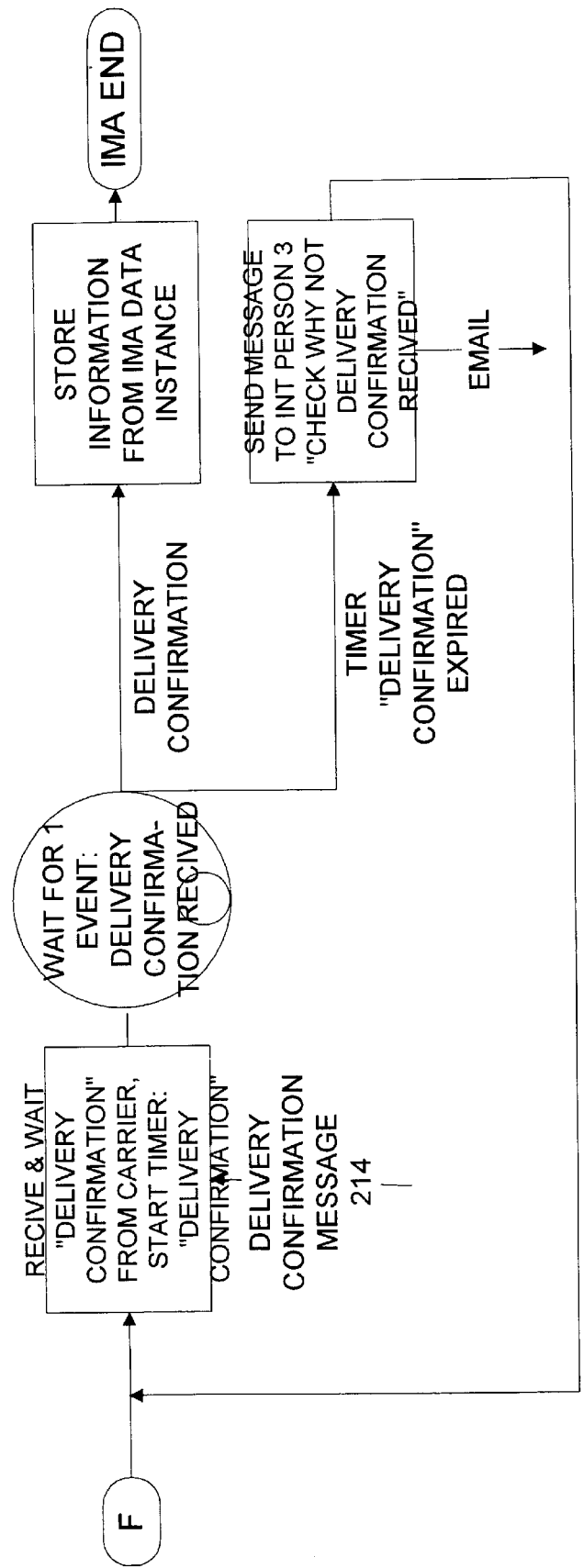

Yet another example of an electronic data interchange process will now be described with reference to FIG. 9a–9e, regarding a transport execution process. FIG. 9a shows an overview of the main partners involved (Supplier, Receiver and Carrier) and which EDI messages that are exchanged (204, 214, 856, 990). It is clear that the exemplified procedure shown in FIG. 9b–9e is executed at the Supplier. The process will handle all electronic data interchange messaging to/from the external partners.

Since the function blocks have been described in detail above with reference to FIG. 4a–4h, as well as the use thereof with reference to FIG. 7a and 7b, and since the process in FIG. 9b–9e has been well provided with explanatory text, the drawings will be regarded as self explanatory and further description thereof will be omitted.

As is understood, many different types of technical related processes, such as the control and monitoring of production processes, medical systems, or the like, may be constructed according to the invention using features similar to those described in the transport execution process in FIG. 9a–9e.

Figure 10A:
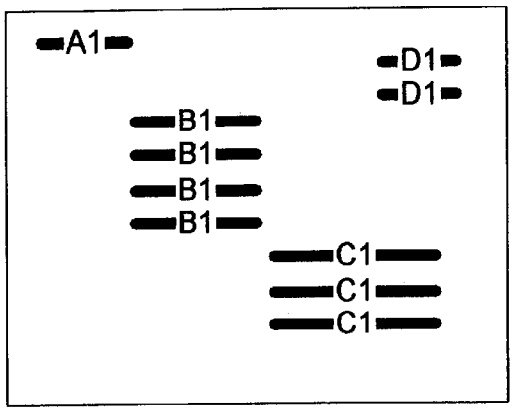
FIG. 10a and 10b show exemplifying messages received by an Intelligent Messaging Application, IMA, process.
Figure 10A:
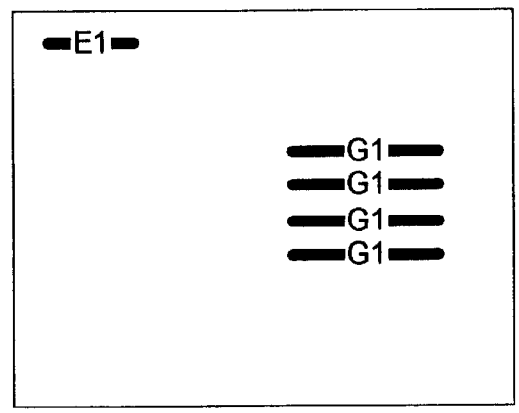
Figure 10B:
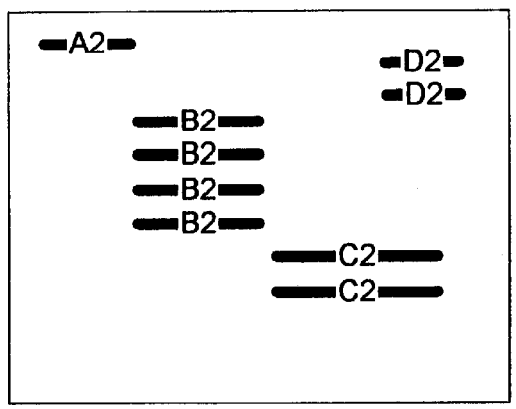
Figure 10B:
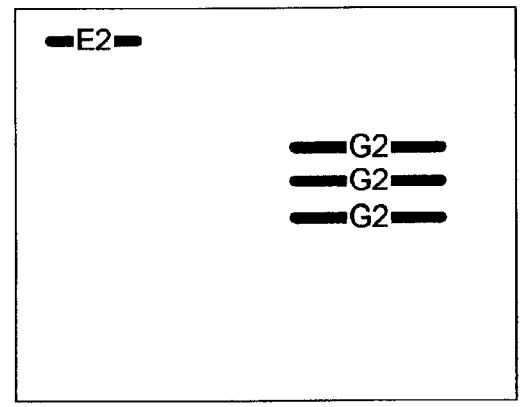
Figure 11:
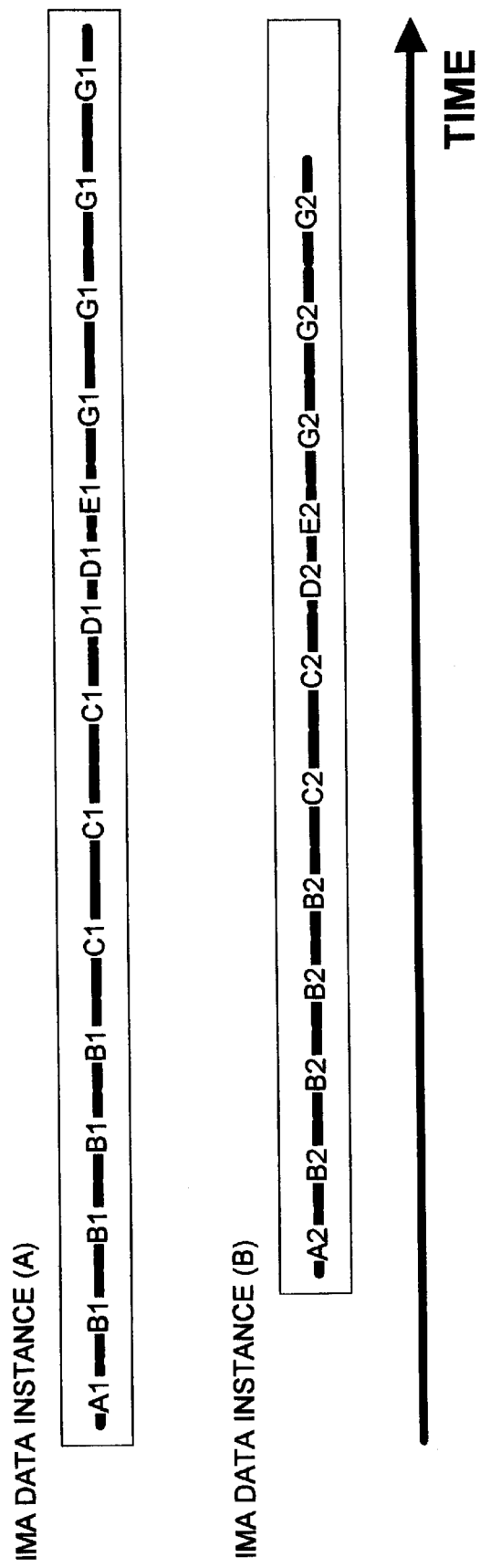
FIG. 11 shows the EDI message data received in the messages of FIG. 10a and 10b represented in the form of two exemplifying IMA data instances stored in sequential time tables in a sequential file system.

With reference to FIG. 10a, 10b and 11, a sequential file system according to the present invention is illustrated. FIG. 10a shows two EDI messages which for example could be the message received by the invoice control process previously described with reference to FIG. 7a, hence they have been named Invoice 1 and Order 1, respectively. The invoice message, for example received by the first block in FIG. 7a, causing the creation of an IMA data instance denoted A for the flow of the invoice control process, contains the invoice data elements A1 . . . D1 with invoice data. The order message, for example received either by the second or the fourth block in FIG. 7a, contains the order data elements E1 . . . G1 with order data. As can be seen in FIG. 11, the created IMA data instance A is stored using only one single table, i.e. all the data elements are stored sequentially in one time sequential table. First, the invoice data elements A1 . . . D1 from the invoice message are stored, and after reception of the order message these elements are followed by the order data elements E1 . . . G1. As an IMA process can handle several IMA data instances at the same time it may receive a second invoice message followed by a second order message while the IMA data instance A is still being handled by the process flow. These latter received messages, shown in FIG. 10b and denoted Invoice 2 and Order 2, respectively, result in the creation of an IMA data instance B. The IMA data instance B is stored in another table in the same sequential way as the IMA data instance A but in a table separated from the table of IMA data instance A. FIG. 11 also shows the time sequential table for IMA data instance B, and the time axis further indicates that the creation of the data instance B occurs later than the creation of the data instance A, but that the storage of data elements partly takes place at the same time for the two data instances.

Figure 12:
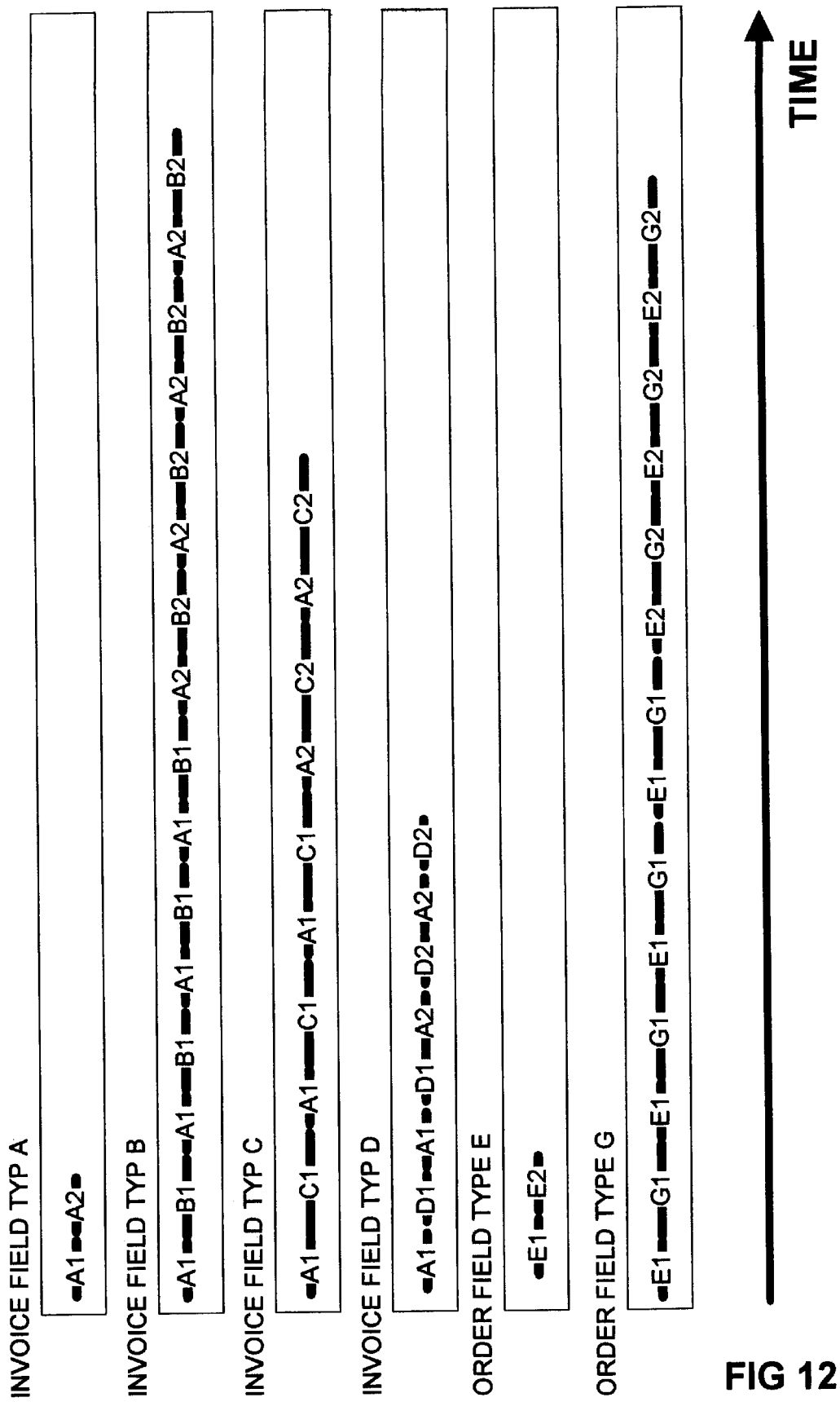
FIG. 12 shows the EDI message data received in the messages of FIG. 10a and 10b stored in SQL tables in a SQL database.

FIG. 12 shows the tables of an SQL database, which is another way to organize and store data. When storing the EDI message data in SQL database tables, the data of sorted in tables according to the type of the fields of data elements in a message. The field A1 from message Invoice 1 and the field A2 from message Invoice 2 are stored in one table. The fields B1 from Invoice 1 and the fields B2 from Invoice 2 are stored in another table with the keys to the right Invoice A1 or A2 and so on.

Consequently, FIG. 11 and FIG. 12 shows two different schemes of how to organize and store the EDI message data. When utilizing sequential memory files in accordance with FIG. 11, each IMA data instance is stored in only one sequential IMA data instance table, whereas when utilizing an SQL database in accordance with FIG. 12, the collection of data in each message is stored in several SQL tables. When comparing these schemes it is easily understood that the utilization of SQL tables requires more complex resources since the data is split into several tables. Assume, for example, that the process from FIG. 7a wishes to compare the invoice fields B1 with the order fields G1. When using IMA data instance tables only one single table, including both B1 and G1, needs to be located and locked by a transaction function, the latter in order to keep the data in the table consistent. Using SQL tables this particular example requires that two tables, one including B1 and one including G1, are located and locked by means of SQL transaction functions. This difference becomes even more apparent when there are a lot more messages and IMA data instances to handle and store than just the ones in the example above.

Figure 13:
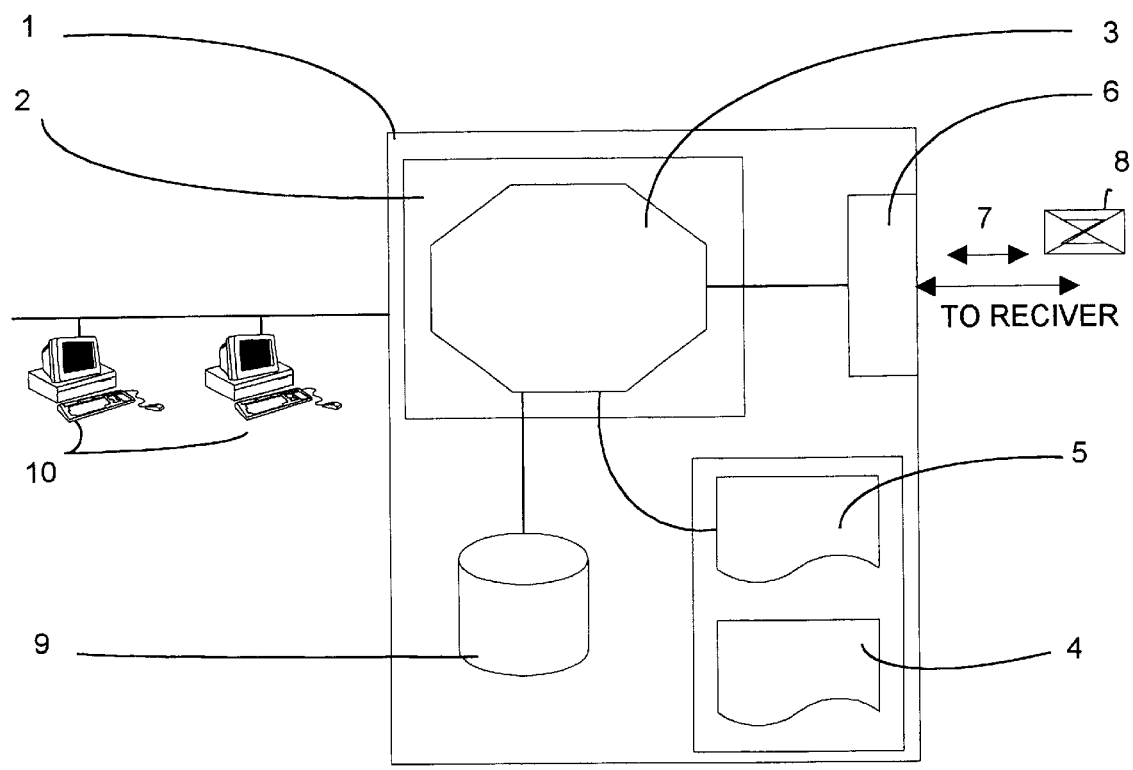
FIG. 13 shows a computer system according to an embodiment of the present invention.

FIG. 13 shows a computer system according to an embodiment of the present invention.

The computer system comprises a computer 1 including: processing means 2, in the form of a CPU, for executing an electronic data interchange process 3 (in FIG. 13, one process has been indicated, however, as is understood, several different processes may be executed by the processing means) and for reading data from, and writing data into, data elements of a data instance during process execution; storing means 4, in the form of a memory, with a sequential memory file for storing data instances of different data definitions belonging to different processes (in FIG. 13, a data instance 5 corresponding to the process 3 has been indicated); communication means 6, in the form of a port on an interface circuit, for receiving and sending 7 electronic data interchange messages 8 from/to a receiver; and a relational database 9 for storing a data instance at the end of a process. The system also comprises terminals or computers 10 utilized by the staff for interacting with the electronic data interchange processes.

In FIG. 13 data instance 5 based upon an underlying data definition is created and stored at a sequential memory file 4 when an electronic data interchange message 8 or another type of event initially starts a process 3 corresponding to the data definition. Data included in an electronic data interchange message 8 received by the port 6 is written by the process 3 into the data elements of the data instance 5 correspondence to said process 3, and data to be included in an electronic data interchange message 3 to be sent from the port 6 is read by the process 3 from the data elements of the corresponding data instance 5. During execution of the process 3, information can be added, changed and removed to/from the data instance 5 in the sequential memory file 4, and at the end of the process information in the data instance may be stored in a relational database 9. With the aid of terminals or other computers 10 the staff can interact with the electronic data interchange process 3. A staff member may, for example, give the process 3 commands or data, or he/she may receive information, for example, in the form of an e-mail sent from the process 3 to the terminal or computer 10.

Figure 14:
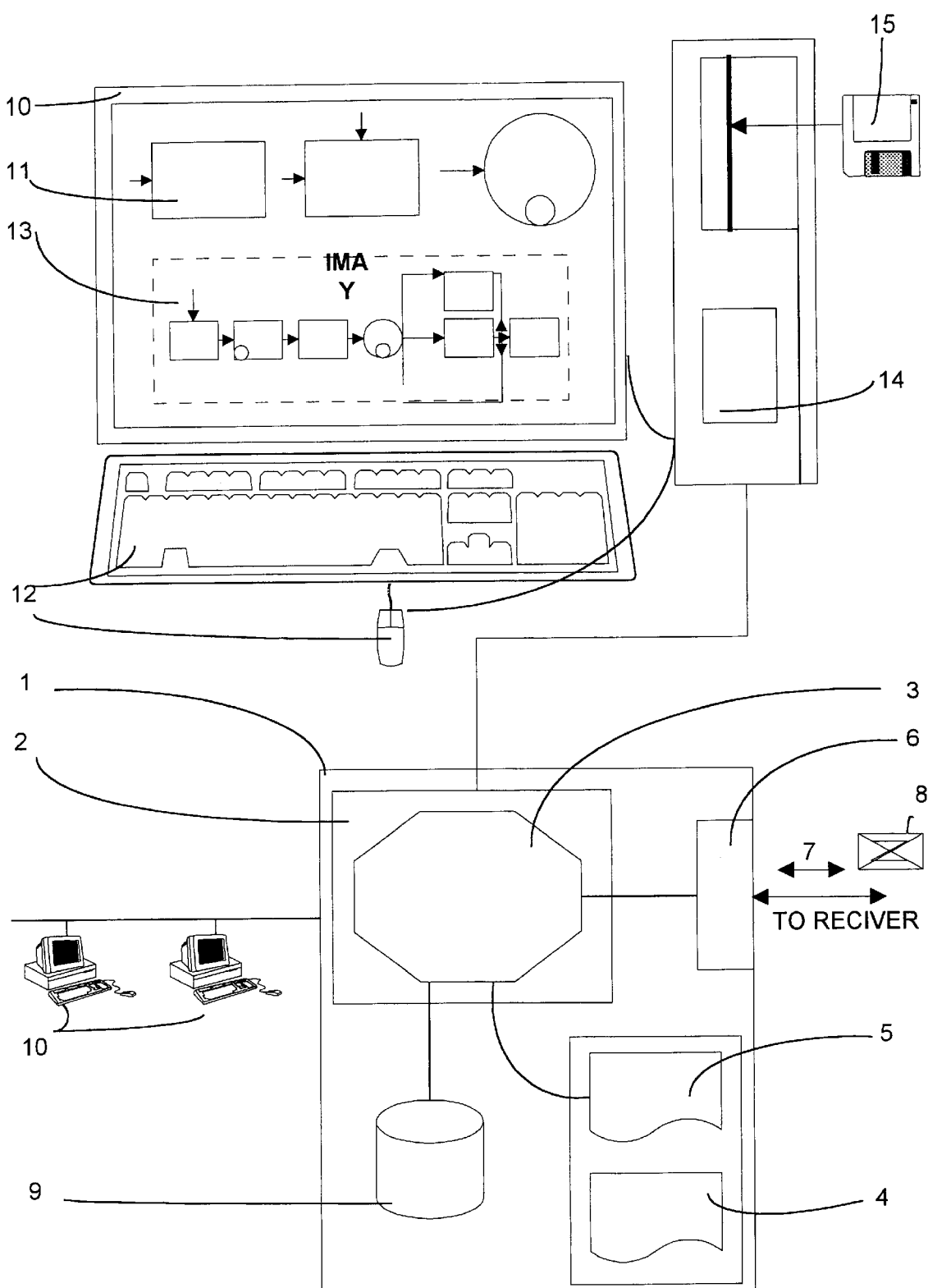
FIG. 14 shows an embodiment of a system for designing an electronic data interchange messaging process.

FIG. 14 shows an embodiment of a system for designing an electronic data interchange messaging process. Elements already described with reference to FIG. 13 are denoted with the same numerals, and further description thereof is omitted for ease of description. Hence, in addition to what has been described with reference to FIG. 13, the system in FIG. 14 further comprises: display means 10, in the form of a computer screen, for displaying symbols 11, representing electronic data interchange process blocks; interface means 12, in the form of a keyboard and a mouse, for a user to design a sequence of symbols by associating said symbols to each other in a desired sequence 13 on said screen 10; and interpretation and data definition defining means 14, in the form of an interpreter realized as an executable software module, for interpreting said sequence 13 of symbols and, based thereupon, defining an electronic data interchange process 3 based upon the electronic data interchange process blocks represented by said associated symbols.

The symbols 11 displayed on the screen 10 represent, and are associated with, all the respective function blocks that an electronic data interchange process can include, such as: the automated activity function block; the automated activity, start timer function block; the automated decision function block; the receive and wait for message function block; the receive message, start timer function block; the send message function block; the send and receive message, start timer function block; the wait for (n) event function block, and different complex composite function blocks, as described above with reference to FIG. 4a–4h. With the aid of the keyboard and/or the mouse 12 a user selects symbols representing those function blocks that are needed to design a process of a certain desired behaviour. Via the keyboard and/or the mouse 12 the user may also define one or more data definitions that should be related to the designed process. The selected symbols are associated with each other in certain desired sequence 13 making up a part of a, or a complete, process. Since each symbol is associated with a particular function block, the sequence of symbols, together with the possibly defined data definitions, is interpreted by the interpreter 14 in order to define an electronic data interchange process based on the function blocks and their relative positions in accordance with the sequence of symbols. The interpreter 14 defines the data definitions based on what a user may input with the keyboard and/or mouse regarding the desired type of data to be associated with the electronic data interchange process. The electronic data interchange process is either immediately upon creation or afterwards transferred to the computer system 1.

An article of manufacture 15 in the form of a computer readable disc may store any software means needed for a system or a computer to be able to: display symbols; design a sequence of symbols; interpret a sequence of symbols; define an electronic data interchange process from a set of symbols; and to execute an electronic data interchange process. All these means stored on the disc is then made available to the system or the computer by loading the software stored on the disc.

Although the invention has been described with reference to specific embodiments thereof and in relation specific situations, it is clear that many modifications and alterations may be made within the scope of the invention as defined by the following claims.

What is claimed is:

1. Method for electronic data interchange messaging, wherein an electronic data interchange process is executed in relation to electronic data to be successively transferred or processed in the execution of said process, said electronic data being stored in a process specific data instance of a predefined data definition, said data definition defining a set of data elements for electronic data to be successively stored and recalled by the process, and wherein said process automatically writes data included in a received electronic data interchange message into, and read data for electronic data interchange from, predefined data elements of said data instance of the data definition during the execution of said process, and wherein said electronic data interchange process comprises a set of predefined function blocks, said blocks including a waiting block executing the function of awaiting whichever comes first; the occurrence of a predefined number of expected events on the expiring of a timer.

2. Method as claimed in claim 1, wherein each execution of the process is associated with a respective data instance of said data definition.

3. Method as claimed in claim 1, comprising storing said data elements of said data instance sequentially in a sequential memory file during said process.

4. Method as claimed in claim 1, comprising storing a subset of the data contained in said data instance at the end of said process.

5. Method as claimed in claim 1, wherein said events comprise the receiving of an electronic data interchange message.

6. Electronic data interchange messaging system, comprising:

processing means for executing an electronic data interchange process, each execution of the process transferring or processing electronic data; and means for receiving and sending electronic data interchange messages;

storing means for storing a process specific data instance of a predefined data definition which includes a predefined set of data elements for electronic data to be successively stored and recalled by the process; and means for automatically writing data included in a received electronic data interchange message into, and reading data for electronic data interchange message sending from, the respective data elements of the data instance during the execution of the process, wherein said processing means includes a timer and is arranged to execute said process by executing a set of predefined function blocks, said blocks including a waiting block executing the function of awaiting whichever comes first; the occurrence of a predefined number of expected events or the expiring of said timer.

7. System as claimed in claim 6, wherein each execution of the process is associated with a respective data instance of said data definition.

8. System as claimed in claim 6, comprising a sequential memory file for sequentially storing said data elements of said data instance during said process.

9. System as claimed in claim 6, comprising means for storing a subset of the data contained in said data instance at the end of said process.

10. System as claimed in claim 6, said processing means being arranged to start executing said process when receiving a predefined electronic data interchange message.

11. System as claimed in claim 6, said processing means being arranged to start executing said process at the expiring of a timer or the changing of a state monitored by said processing means.

12. System as claimed in claim 8, wherein said events comprise the receiving of an electronic data interchange message.

13. System for designing an electronic data interchange messaging process, comprising:

display means for displaying symbols, representing electronic data interchange process blocks;

interface means for a user to design a sequence of symbols by associating said symbols to each other in a desired sequence on said display;

interpretation means for interpreting said sequence of symbols and, based thereupon, defining an electronic data interchange process based upon the electronic data interchange process blocks represented by said associated symbols; and data definition means for defining a data definition in relation to the designed electronic data interchange process, said data definition comprising set of data elements to be interchanged in each execution of said process, said data definition means being arranged to automatically define said data definition based upon predefined input and output electronic data interchange message data of said process.

14. System as claimed in claim 13, wherein used interface means is arranged to enable said user to define said data definition.

15. System as claimed in claim 13, comprising processing means for executing said electronic data interchange process.

16. System as claimed in claim 15, wherein each execution of said data interchange process is associated with a data instance of a data definition for the process.

17. System as claimed in claim 16, comprising a sequential memory file for sequentially storing said data elements of said data instance during said process.

18. System as claimed in claim 17, wherein the designed process is arranged to automatically write data included in an electronic data interchange message into, and read data for electronic data interchange from, the respective data elements of a data instance of said data definition during the execution of the process.

19. System as claimed in claim 13, wherein said symbols comprise a symbol corresponding to a waiting block performing the function awaiting whichever comes first: the occurrence of a predefined number of expected events or the expiring of a timer.

20. System as claimed in claim 17, comprising storing means for storing a subset of the data contained in said data instance at the end of said process.

21. An article of manufacture, comprising means for causing a computer to:

display symbols, representing electronic data interchange process blocks, on a display;

provide a user with means to design a sequence of symbols by associating said symbols to each other on said display;

interpret said user designed sequence of symbols and, based thereupon, define an electronic data interchange process based upon the electronic data interchange blocks that are represented by said associated symbols; and define a data definition in relation to the designed electronic data interchange process, comprising a set of data elements, being of defined data element types, to be interchanged in each execution of said process.

22. An article of manufacture as claimed claim 21, comprising means for causing a computer to execute said electronic data interchange process.

23. An article of manufacture as claimed in claim 22, comprising means for causing said computer to allocate a data instance of the data definition for each execution of said process.

24. An article of manufacture as claimed in claim 21, comprising means for causing said computer to initiate the execution of said process by the receiving of a predefined electronic data interchange message.

25. An article of manufacture as claimed in claim 21, wherein the designed process is arranged to automatically write electronic message data into, and read electronic message data from, the respective data elements of a data instance of the data definition during the execution of the process.

26. An article of manufacture as claimed in claim 21, comprising means for causing said computer to store a subset of the data contained in said data instance of the data definition at the end of the execution of said process.

27. An article of manufacture as claimed in claim 26, said article of manufacture being in the form of a computer readable memory.

28. Method for electronic data interchange messaging, between a first computer and a second computer, comprising the steps of:

creating an electronic data interchange process using displayed symbols which are representative of process blocks:

executing said electronic data interchange process in which electronic data is transferred in a structured format as an electronic data interchange message;

writing data received in said electronic data interchange message into predefined data elements of a data instance associated with said electronic data interchanging process;

reading data to be used in a second electronic data interchange message of said data instance; and transmitting said second electronic data interchange message.

* * * * *